(12) United States Patent
Morys

(10) Patent No.: US 8,260,554 B2
(45) Date of Patent: Sep. 4, 2012

(54) APPARATUS AND METHOD FOR MOTION CORRECTION TO SENSOR MEASUREMENTS

(75) Inventor: Marian Morys, Downington, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 524 days.

(21) Appl. No.: 12/391,225

(22) Filed: Feb. 23, 2009

(65) Prior Publication Data

US 2009/0222209 A1 Sep. 3, 2009

Related U.S. Application Data

(60) Provisional application No. 61/032,670, filed on Feb. 29, 2008.

(51) Int. Cl.
*G01V 1/40* (2006.01)
*G01V 3/18* (2006.01)
*G01V 9/00* (2006.01)

(52) U.S. Cl. ................................ 702/9; 702/6

(58) Field of Classification Search .................. 702/6, 9
See application file for complete search history.

(56) References Cited

U.S. PATENT DOCUMENTS

| | | | |
|---|---|---|---|
| 4,665,511 A | 5/1987 | Rodney et al. | |
| 5,044,462 A | 9/1991 | Maki | |
| 5,369,623 A * | 11/1994 | Zerangue | 367/93 |
| 5,899,958 A | 5/1999 | Dowell et al. | |
| 5,924,499 A * | 7/1999 | Birchak et al. | 175/40 |
| 5,987,385 A * | 11/1999 | Varsamis et al. | 702/6 |
| 6,065,219 A * | 5/2000 | Murphey et al. | 33/544 |
| 6,310,426 B1 | 10/2001 | Birchak et al. | |
| 6,518,756 B1 | 2/2003 | Morys et al. | |
| 2007/0203651 A1* | 8/2007 | Blanz et al. | 702/6 |

OTHER PUBLICATIONS

Voldi Maki, et al., "Dynamically Focused Transducer Applied to the CAST Imaging Tool", SPWLA 32nd Annual Logging Symposium, Jun. 16-19, 1991, SPWLA, Houston, TX.

* cited by examiner

*Primary Examiner* — Janet Suglo
(74) *Attorney, Agent, or Firm* — W. Schmidt

(57) ABSTRACT

A method for correcting a motion related distortion in a sensor measurement comprises establishing a reference position in a borehole. A parameter of interest is measured at a plurality of toolface angles as the tool makes a revolution in the borehole. A distance to a wall of the borehole is measured associated with each parameter of interest measurement. A lateral motion of the tool is measured between each parameter of interest measurement, and a toolface angle of the tool is measured at each parameter of interest measurement. A controller comprising a processor acts according to programmed instructions to calculate a correction to the parameter of interest measurement referenced to the reference position based at least partly on the measured tool motion.

27 Claims, 20 Drawing Sheets

APPARATUS AND METHOD FOR MOTION CORRECTION TO SENSOR MEASUREMENTS

CROSS-REFERENCE TO RELATED APPLICATIONS

This application claims priority from U.S. Provisional Application 61/032,670 filed on Feb. 29, 2008, which is incorporated herein by reference.

BACKGROUND OF THE INVENTION

The present disclosure relates generally to the field of wellbore logging, and more particularly to the field of motion correction of sensor measurements.

Sensors may be positioned at the lower end of a well drilling string which, while drilling is in progress, continuously or intermittently monitor predetermined drilling parameters and formation data and transmit the information to a surface detector by some form of telemetry. Such techniques may be termed "measurement while drilling" (MWD) and/or "logging while drilling" (LWD). As used herein, the terms MWD and LWD are considered interchangeable. Some sensors may generate data that is processed and used downhole, while other sensors may generate data that is stored in the downhole tool and processed later when the tool is returned to the surface.

A number of downhole sensors used in MWD/LWD systems may experience measurement errors caused by the dynamic movement of the sensor related to the high shock and vibration downhole drilling environment. For example, borehole imaging tools and magnetic resonance imaging (MRI) tools may experience lateral movements that approach the measurement resolution of such sensors during the measurement cycle. Such movement may create measurement artifacts that substantially degrade the usefulness of the processed measurement output.

BRIEF DESCRIPTION OF THE DRAWINGS

A better understanding of the present invention can be obtained when the following detailed description of example embodiments are considered in conjunction with the following drawings, in which.

Figure 1:
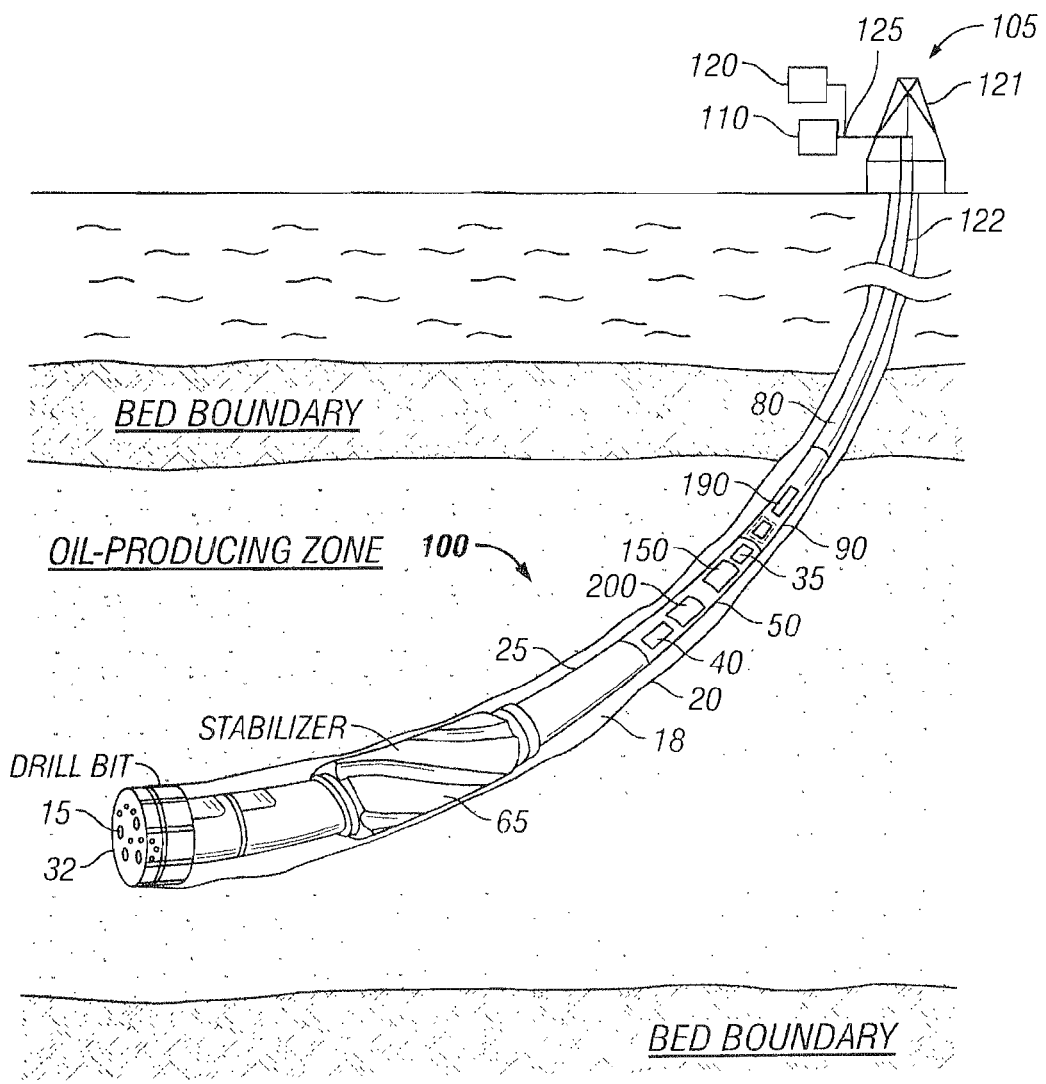
FIG. 1 is a sketch of a drilling system comprising a bottomhole assembly for drilling a borehole through an underground formation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION

Referring initially to FIG. 1, a drilling system comprising a bottomhole assembly (or BHA) 100 is shown for drilling a borehole (or wellbore) 20 through underground formations. In the exemplary embodiment of FIG. 1, the BHA 100 comprises a drill bit 32 for drilling the wellbore 20, a near bit stabilizer 65, a downhole motor or turbine 25, an MWD/LWD tool 50, a mud pulser collar 90, and a section of drill collar 80 or other conventional downhole components. In accordance with conventional industry practice, the drill collar section 80 connects to a drillstring 122, which functions to couple the BHA 100 to the surface equipment. As one skilled in the art will understand, a particular BHA configuration may vary substantially from that shown in FIG. 1. For example, the downhole motor 25 could be removed from the BHA 100 for certain well segments or intervals. As one skilled in the art will understand, a BHA may be configured to optimize the results achieved for a particular well interval of a well plan. The drill bit, stabilizers, mud pulser collar, and drill collars may be components that are known in the drilling industry, and will not be described in detail herein, except as they particularly relate to the present disclosure.

In one example, a surface system 105 comprises a derrick 121 supporting the drillstring 122 and BHA 100. A pump supplies drilling fluid to the interior of drillstring 122, and through the interior of the bottomhole drilling assembly 100. The drilling mud exits from the nozzles 15 in the bit 32 and functions to cool and lubricate the bit 32 and to remove earth cuttings and carry the cuttings to the surface along the annulus 18 of the wellbore 20. The drilling mud may also serve as a communication medium between telemetry and control units 190 in the mud pulser collar 90 and components at the surface of the well. By modulating the flow of the drilling mud through the interior of the drillstring, pressure pulses may be generated in the column of drilling fluid. By selectively varying the pressure pulses through the use of a mud pulser in the mud pulser collar 90, encoded pressure pulse signals can be generated to carry information indicative of downhole parameters to the surface for analysis. The pressure signals may be detected by a sensor 125 in the surface piping and the signal may be decoded and processed by a surface controller 120. Surface controller 120 may have suitable processors, data storage, and user interface equipment for receiving and processing received signals from downhole into suitable information for drilling and formation evaluation and control. Alternatively, drillstring 122 may comprise hard-wired drill pipe, known in the art. Such hard-wired drill pipe comprises a conductor installed therein and suitable couplings at each end of the drill pipe for enabling power and data communication between the surface and downhole tools. Such drill pipe is commercially available, and will not be described here in detail. In yet another alternative embodiment, drill string 122 may comprise wired or unwired coiled tubing (not shown) connected to BHA 100. Such coiled tubing is known in the art and is not described here in detail.

The stabilizer 65 may include adjustable blades for steering BHA 100. The inclination of the bottomhole assembly can be changed by selectively varying the diameter of the stabilizer blades. The course of BHA 100 also can be changed in accordance with other techniques, such as by selectively turning a downhole motor, adjusting the angle of bend in a bent motor housing, or changing the weight on bit of the system.

The BHA 100 may also include a downhole controller unit 150, which orchestrates the operation of the various downhole sensors. As will be described in more detail below, the downhole controller 150 also provides processing capabilities downhole to permit the sensed data to be processed in a real-time environment, and to permit the processed data to be available during the drilling process. As one skilled in the art will realize, the downhole controller may be located in any convenient location in the BHA 100, such as, for example, the mud pulser collar 90. Similarly, a power source 35 is shown in the MWD tool 50. The power source 35 may comprise batteries and/or an electric generator, and may be positioned in any convenient location to provide power to the various electrical assemblies in the BHA 100.

The MWD tool 50 may be located close to the drill bit 32 to facilitate the ability to examine the formation as close to the bit as possible. Alternatively, the MWD tool 50 may be located further up the bottomhole assembly 100 from the drill bit 32, without departing from the principles of the present invention. Moreover, the MWD tool 50 may in actuality comprise multiple collar sections if necessary to house other MWD sensors.

In one example embodiment, directional sensors 40 are provided in the logging tool 50, or elsewhere in the bottomhole assembly 100 to provide an indication of inclination of the BHA 100, the azimuth of the BHA, and the tool face angle. For purposes of illustration, the directional sensors 40 are shown in FIG. 1 in the lower portion of the LWD tool 50.

In accordance with known techniques, wellbore directional measurements can be made as follows: a three axis accelerometer measures the earth's gravitational field vector. From this measurement, the inclination of the bottomhole assembly can be determined to provide an indication of the deviation of the wellbore with respect to vertical. The three axis accelerometer also provides a measure of "high-side tool face angle," which, in this example, is the orientation (rotational about the tool axis) angle between a scribe line on the tool and the high side of the wellbore. Additionally, a three axis magnetometer measures the earth's magnetic field vector in a similar manner. From the combined magnetometer and accelerometer data, the azimuth and magnetic tool face angle of the MWD tool may be determined. As one skilled in the art will understand, hole azimuth is the direction of the borehole projected onto the horizontal plane relative to magnetic North. If a true north seeking sensor is used, for example a north seeking gyroscope, then the azimuth may be relative to true North.

Figure 2:
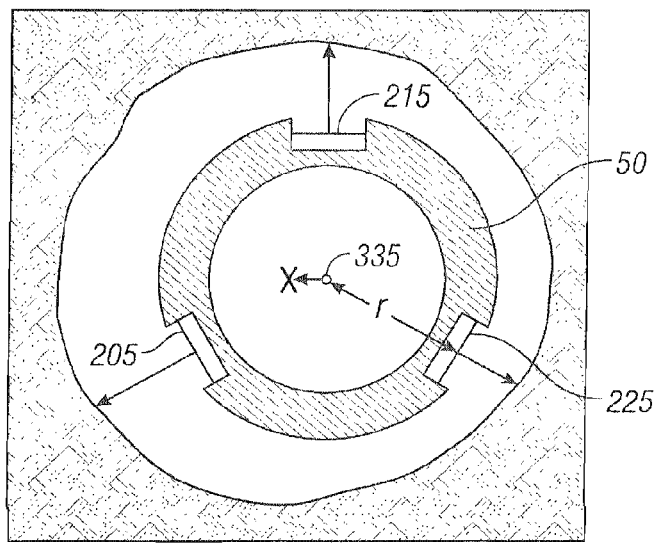
FIG. 2 shows a cross section of a downhole imaging tool.
Figure 3:
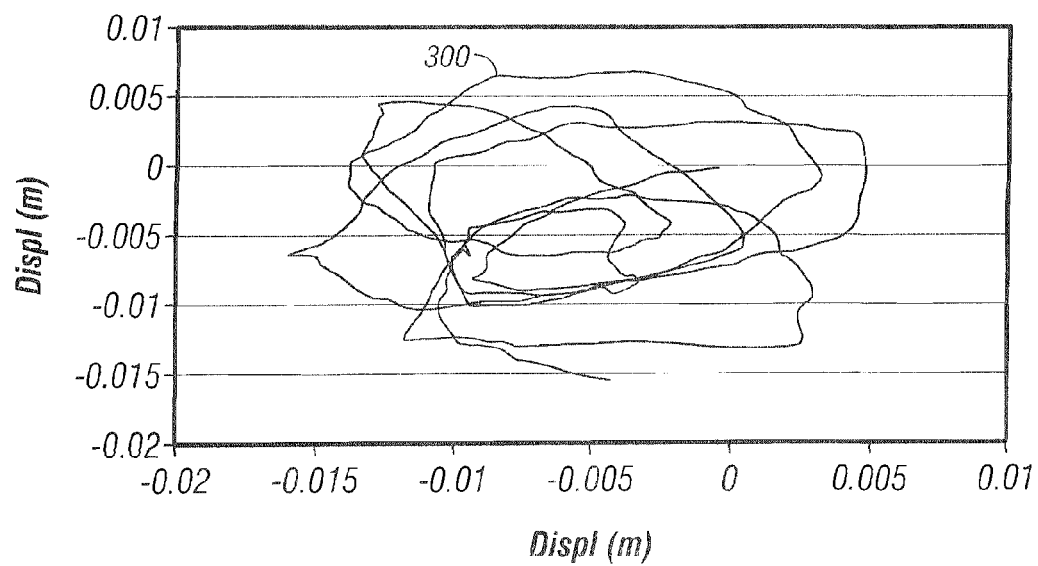
FIG. 3 is a plot showing an example of the motion of a downhole tool during drilling.

The MWD tool 50 permits parameters to be monitored downhole during the drilling process to enhance drilling. In one example, imaging tool 200 in BHA 100 may be used to obtain an image of the interior surface of the borehole 20 or the image of the formation properties around the borehole either during drilling, or during the removal of the BHA 100 from the wellbore. While the concept described herein may be applied to non-acoustic methods this embodiment refers, for clarity, to examples using an ultrasonic transducer. Imaging tool 200 may comprise one or more ultrasonic imaging transducers. As used herein, the term acoustic transducer is intended to comprise ultrasonic acoustic transducers. For example, see FIG. 2, in one embodiment a plurality of imaging transducers 205, 215, 225 may be arranged substantially equidistantly around the circumference of the tool 50, in substantially the same plane transverse to the longitudinal axis of the MWD tool 50. Alternatively, the transducers 205, 215, 225 may be positioned in a staggered arrangement, if desired. Thus, in the example of FIG. 3, where three imaging transducers 205, 215, 225 are used, each of the transducers may be displaced circumferentially about 120° from the other imaging transducers. In one example, each of the transducers may serve as both a transmitter and a receiver.

In one embodiment, the imaging transducers 205, 215, 225 may be fired simultaneously with a high frequency acoustic signal. Imaging transducers 205, 215, and 225 may be any suitable acoustic transducers, including, for example, acoustic transducers, focused acoustic transducers, dynamically focused acoustic transducers, optical transducers, and electromagnetic transducers. Examples of such transducers are included later in this description.

In one example embodiment, the acoustic frequency may be in the range of 200 kHz-1000 kHz. The received signals may be conditioned to remove noise, and then processed to determine a distance to the borehole wall based upon the time-of-flight of the acoustic signal. In an alternative embodiment, a mechanical caliper transducer in a caliper tool, known in the art, may provide distance measurements to the wall of the borehole. The reflected acoustic waveform may be stored and/or processed to determine the reflected amplitude and phase of the reflected signal relative to the transmitted signal. Such data may be used to obtain additional information regarding the properties of the formation, such as the acoustic impedance of the formation, and the surface roughness and the presence of voids in the borehole wall. In one example, different pulse widths and frequencies may provide data related to the surface roughness. Surface roughness reflections may vary depending on the relative size of the surface feature relative to the wavelength of the signal. In one embodiment, each of the imaging transducers 205, 215, 225 may be activated in the range of about 16 to about 256 times for each revolution of the tool.

Figure 4A:
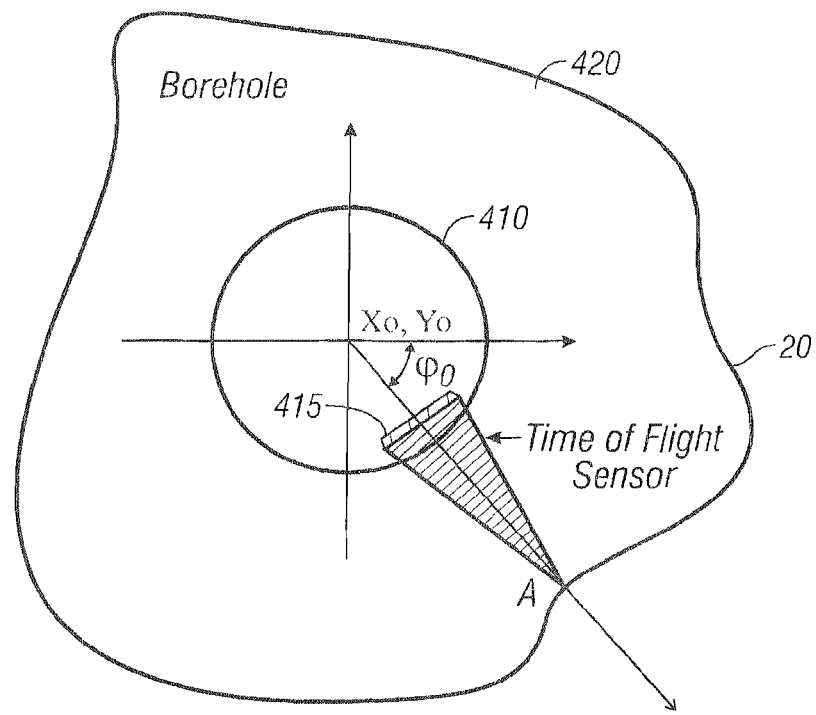
FIG. 4A shows the position of a downhole tool in the wellbore at position $X_0$, $Y_{04}$
Figure 4B:
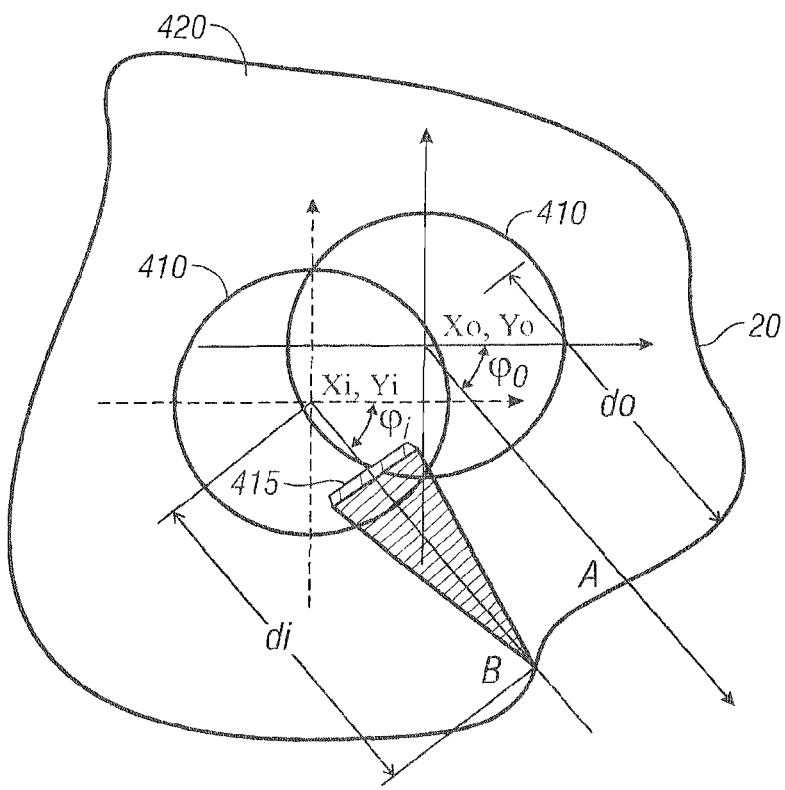
FIG. 4B shows a different position of the downhole tool in a subsequent rotation with a position Xi, Yi and a view of a different point of the wellbore caused by drilling vibration.

In general, the borehole imaging techniques described above assumes that the axis of the tool is stationary in relation to the borehole axis. Downhole measurements, however, offer evidence that the BHA axis experiences substantial radial movement while drilling. Under certain conditions the drill collar can exhibit extreme vibrational movement such as, for example, the bit-whirl situation illustrated in FIG. 3. In this field measurement of drilling vibrational movement, drill collar movement 300 is shown for a 6.75" drill collar, rotating at approximately 50 RPM, with about 20000 lbs of weight on bit (WOB). The magnitude of the drill collar movement 300 approached 20 mm and the frequency of the lateral oscillation was in several Hz range. As indicated above, when the magnitude of lateral motion of the tool axis approaches the sensor resolution, the acquired time-of-flight data may be distorted. This distortion is created because the sensor can not distinguish between change of distance to target due to borehole geometry from distance changes caused by lateral movement of the tool. In addition, because of tool motion, data correlated to tool face sensor values do not guarantee that the same point of the borehole is targeted at the same tool face values in subsequent scans even if the rate of penetration is zero. For example, FIGS. 4A and 4B illustrate some of the effects of lateral tool movement on correlating time-of-flight data versus toolface as a result of tool motion. FIG. 4A shows the axis of tool 410 positioned at Xo,Yo with a toolface of $\phi_0$ and a sensor 415 targeting point A on the surface of borehole 20. In a subsequent rotation, due to drilling vibration motion, the axis of tool 410 may move to point $(X_1, Y_1)$ with toolface $\phi_1$, see FIG. 4B. The translational shift results in a reflection from a different point B on the borehole wall when $\phi_1 = \phi_0$. Without taking the tool movement into account, the details of the borehole surface cannot be resolved accurately. In addition, there may also be a difference in the distance between the sensor and the borehole wall at points A and B, indicated by the distances $d_0$ and $d_1$. Variations of distance between the sensor and the borehole (standoff) may further complicate the measurement by introducing fluctuations in attenuation and phase of the reflected signal. For example, a change of thickness of drilling fluid 420 in borehole 20 may cause changes in the signal attenuation and phase as the signal propagates through the different distances. This effect may apply to any sensor that uses the phase and amplitude of a reflected waveform. Non-limiting examples include an acoustic sensor, a magnetic sensor, for example an MRI sensor, and a high frequency electromagnetic sensor, for example an electromagnetic wave resistivity sensor. If drilling fluid properties are constant the effect may be corrected. However, the drilling fluid properties may change with temperature, pressure and drilling fluid composition, requiring continuous recalibration.

Correction of Motion Related Distortions of Sensor Measurements

In one example, the present techniques may be used to correct distance measurements made by an acoustic imaging tool for determining the borehole geometry as a function of depth. The borehole geometry correction establishes a reference point (Xo, Yo) that is fixed in relation to the surrounding formation, at least in a timeframe of several tool revolutions, typically within a timeframe of several seconds. A motion tracking system measures the tool displacement in relation to the reference point (Xo,Yo). As the tool rotates, each measurement of distance to the borehole wall is transformed to the fixed coordinate system and the reference point as described below.

Figure 5:
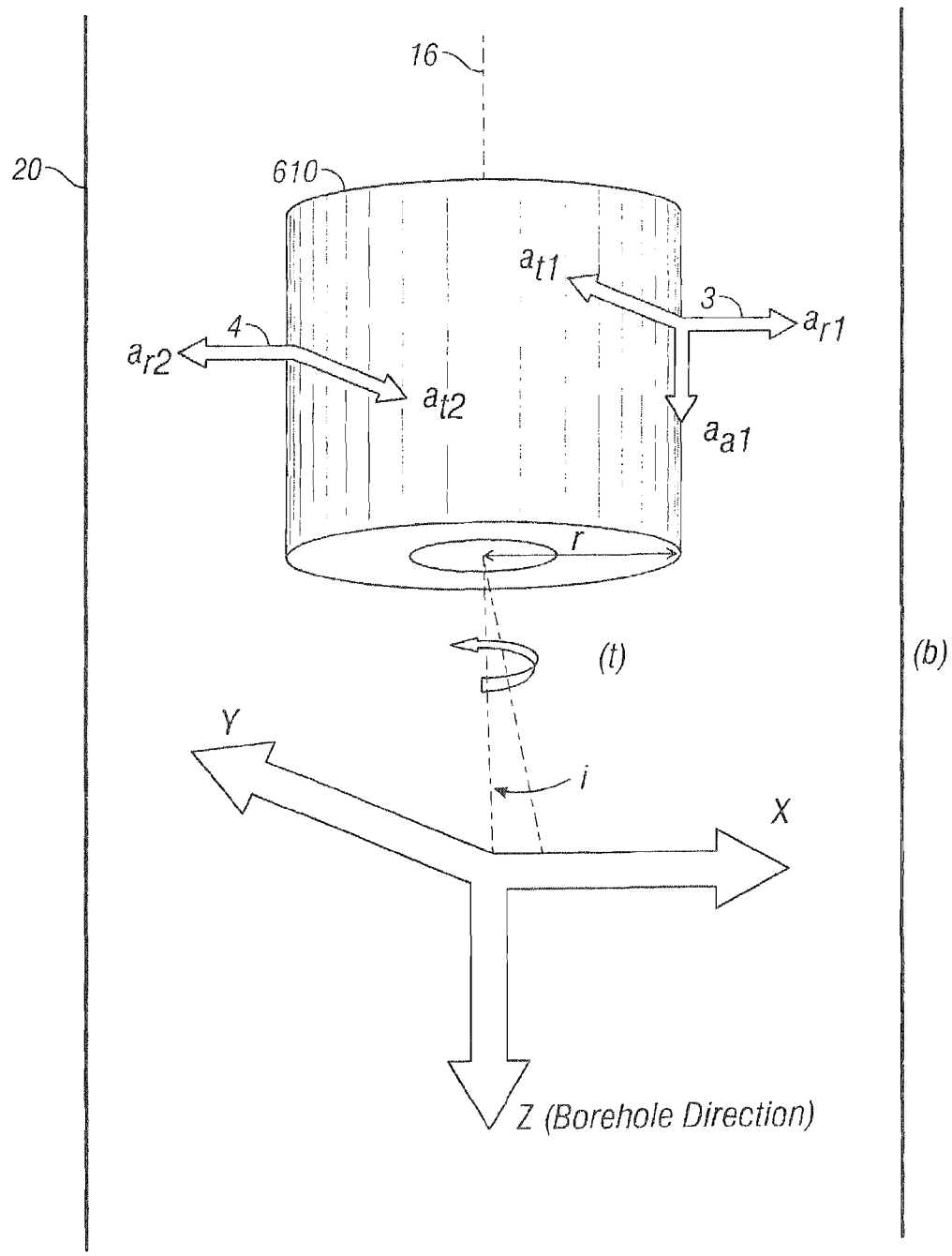
FIG. 5 shows a sketch of sensor coordinate frames.
Figure 6A:
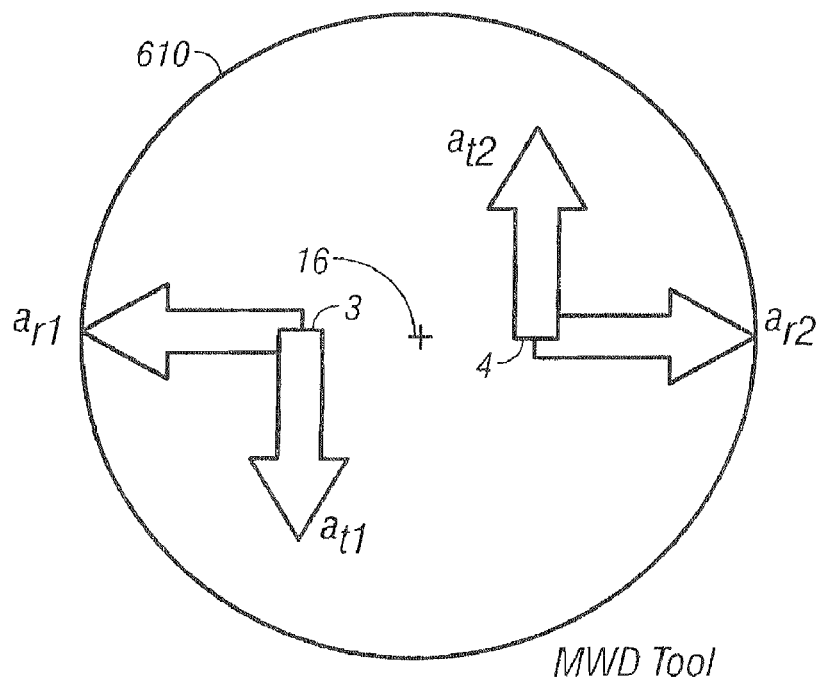
FIGS. 6A, 6B show examples of locations of accelerometer locations in a downhole tool.
Figure 6B:
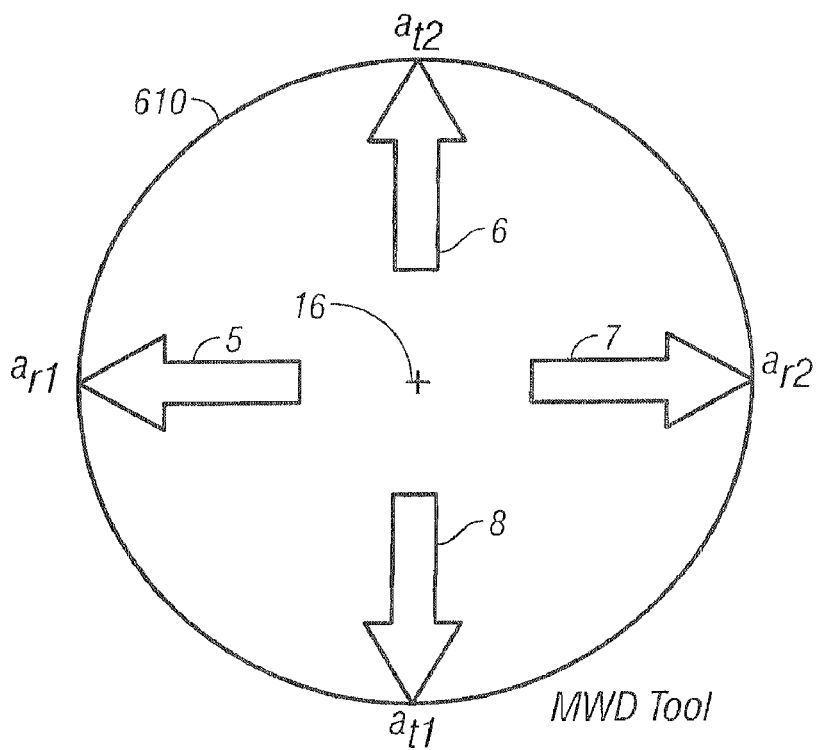

In one example, FIGS. 5, 6A, and 6B describe a motion tracking system for determining motion of a downhole MWD tool. In FIG. 5, the Cartesian XYZ reference frame is related to the borehole 20, where the tool 610 is placed. The radial-tangential-axial (r-t-a) reference frame, on the other hand, is related to tool 610, which in general may be rotating. In one embodiment, two accelerometers 3 and 4, are placed opposite each other, across the tool axis of rotation 16, as shown in FIG. 6A. Accelerometer 3 provides orthogonal radial and tangential acceleration readings $a_{r1}$, $a_{t1}$, and, optionally, the axial acceleration tool component $a_{a1}$, (not shown). Accelerometer 4 provides the radial and tangential acceleration readings $a_{r2}$, $a_{t2}$ respectively, and optionally acceleration component $a_{a2}$. FIG. 6B shows an alternative embodiment with four separate accelerometers, 5, 6, 7, and 8, each providing a single acceleration reading, which together operate in the same manner as the aforementioned two accelerometers. The two accelerometers 3 and 4, provide $a_{r1}$, $a_{r2}$, $a_{t1}$, and $a_{t2}$, all located in the same plane. This arrangement provides measurements of lateral tool acceleration in the tool's rotating frame free of centrifugal and angular acceleration effects. In accordance with the present invention, a first and second magnetometer (exact position not shown) provide magnetic readings $B_x$ and $B_y$. The magnetometers are mounted on or in the drilling tool 610 to provide the tool's orthogonal magnetic readings $B_x$ and $B_y$ relative to the earth's magnetic field vector. The magnetometers may be placed on or in the tool linearly aligned with the position of the accelerometers and the tool axis of rotation 16. Using calculation techniques known in the art, instantaneous determination of tool 610 position may be made in real time, downhole. The instantaneous position measurements may be used with the methods described below to correct sensor measurements for tool movement.

Determining Trajectory of Lateral Tool Motion

The present technique utilizes at least two independent corrections. One correction removes the gravitational component from the acceleration readings that results when the tool is tilted away from the vertical direction. Another correction provides the lateral velocity of the drilling tool relative to a borehole reference frame.

In one example embodiment, a method that corrects both inaccuracies includes the following steps (discussed again in greater detail later):

(a) measuring the instantaneous tool lateral acceleration components, $a_{r1}$, $a_{r2}$, $a_{t1}$, and $a_{t2}$, employing an accelerometer detection system and measuring the tool's instantaneous magnetic values $B_x$ and $B_y$;

(b) compensating for the centrifugal and radial acceleration components by calculating lateral tool accelerations in the rotating frame of reference;

$a_r = (a_{r1} - a_{r2})/2$ the tool acceleration in the direction of $a_{r1}$;

$a_t = (a_{t1} - a_{t2})/2$ the tool acceleration in the direction of $a_t$;

(c) calculating the tool's instantaneous magnetic field (tool magnetic phase) $\phi_m$;

(d) using the accelerometer and magnetometer instantaneous data measurements, determine the phase shift $\phi_0$, which is the difference between the magnetic phase $\phi_m$ and the gravitational tool phase $\phi$, determining the borehole inclination gravitational component $G \sin(\alpha_t)$ relative to vertical;

(e) calculating the tool lateral acceleration components and, optionally, correcting for the gravitational component, or converting the measurements to the borehole reference frame, or doing both; and (f) calculating the initial velocity and the instantaneous velocity by integrating the acceleration components calculated in step (e).

In accordance with the present invention, the signals recorded by the accelerometers are related to other system variables by the following expressions:

$$a_{r1} = a_x \cos(\phi) + a_y \sin(\phi) + r\omega^2 + G\sin(\alpha_i)\cos(\phi) \quad (1)$$

$$a_{r2} = a_x \cos(\phi) - a_y \sin(\phi) + r\omega^2 + G\sin(\alpha_i)\cos(\phi)$$

$$a_{t1} = a_x \cos(\varphi) + a_y \sin(\varphi) + r\frac{d\omega}{dt} + G\sin(\alpha_i)\sin(\phi)$$

$$a_{t2} = -a_x \cos(\varphi) - a_y \sin(\varphi) + r\frac{d\omega}{dt} + G\sin(\alpha_i)\sin(\phi)$$

$$a_{a1} = a_z + G\cos(a_1)$$

where:

$a_x$, $a_y$, and $a_z$ are the acceleration components of the tool's center of gravity relative to the borehole XYZ reference frame;

$\phi$ is the instantaneous phase of the rotating tool ($\phi=0$ when $a_{r1}$ is aligned with the X axis);

$\alpha_i$ is the tool inclination angle in relation to the earth's gravity vector (vertical);

r is the rotational radius of the accelerometer; and

G is the acceleration constant of the earth's gravitational field ($\cong 9.81$ m/s$^2$).

G $\sin(\alpha_i)\sin(\phi)$ and G $\sin(\alpha_i)\cos(\phi)$ are the gravitational components arising from tool tilt away from vertical.

The tool phase $\phi$ is:

$$\phi(t) = \phi_{t0} + \int_0^t \omega(t) dt \quad (2)$$

where $\omega$ is the instantaneous angular speed of the tool. From previous equations for $a_{r1}$, and $a_{r2}$ the modulus of $\omega$ is calculated as $$|\omega| = \sqrt{\frac{a_{r1} + a_{r2}}{2r}} \quad (3)$$

and the angular acceleration is $$\frac{d\omega}{dt} = \frac{a_{t1} + a_{t2}}{2r} \quad (4)$$

By tracking both $|\omega|$ and $d\omega/dt$, $\omega$ can be determined.

Employing the above relationships, the method for obtaining lateral tool velocity with correction for the gravitational component and conversion of the velocity relative to a borehole reference frame is now discussed in detail. The method comprises the following.

(a). Obtain instantaneous tool lateral acceleration components $a_{r1}$, ar2, $a_{t1}$, and $a_{t2}$, and the tool's instantaneous magnetic values Bx and By.

In one embodiment, this step requires reading real-time data measurements from the two (or more) accelerometers and two magnetometers to obtain the parameters $a_{r1}$, $a_{r2}$, $a_{t1}$, $a_{t2}$. Parameters $B_x$ and $B_y$ are orthogonal magnetic phase readings relative to the earth's magnetic field.

(b). Compensate for the centrifugal and radial acceleration components by calculating lateral tool accelerations in the rotating frame of reference employing the following formulas:

$a_r = (a_{r1} - a_{r2})/2$ the tool acceleration in the direction of $a_{r1}$;

$a_t = (a_{t1} - a_{t2})/2$ the tool acceleration in the direction of $a_{t1}$;

(c). Determine $\phi_m$, the tool's instantaneous magnetic phase relative to the earth's magnetic field (tool magnetic phase).

The magnetic phase readings are used to determine the tool's magnetic phase with respect to the earth's gravitational pull. The direction of the magnetic field in space however, does not directly coincide with the gravitational pull; there is a phase difference (phase shift) of. In most conditions, where the magnetic field disturbance is not strong and the borehole has a relatively constant direction, the phase shift $\phi_0$ will be a constant within the time frame of the few seconds necessary to determine the tool velocity. Therefore, in the relationship $\phi=\phi_m+\phi_0$ a constant $\phi_0$ can be reasonably assumed. Knowing $B_x$ and $B_y$, the tool's magnetic rotation phase may be obtained using the expressions:

$B_x = B \sin(\alpha_m)\cos(\phi_m)$ $B_x = B \sin(\alpha_m)\sin(\phi_m)$ (5)

where B is the amplitude of the magnetic induction signal, and $\alpha_m$ is the angle between the tool's axis and the earth's magnetic field vector.

The tool magnetic phase $\phi_m$ is determined directly from (5) provided that the borehole direction does not coincide with the direction of the B vector such that the noise level of the magnetic measurements is comparable to the signals $B_x$ and $B_y$. Knowing $B_x$ and $B_y$, the tool's magnetic rotation phase $\phi_m$ may be obtained by using a four quadrant arctangent function the function $\phi$=atan 2 (By, Bx) common to most mathematical function libraries. The function atan 2 resolves all four quadrants of the full angle (360 degrees).

(d). Determine the phase shift $\phi 0$ and the borehole inclination gravitational component G $\sin(\alpha_i)$ relative to vertical, using the accelerometer and magnetometer instantaneous data measurements, and calculate $\phi$.

If a correction for tool tilt is not desired, then it is unnecessary to determine G $\sin(\alpha_i)$ in this step. However, it is the usual case to correct for the effect of tool tilt. The following procedure is used in one embodiment to determine G $\sin(\alpha_0)$ and $\phi_i$, where G is the acceleration constant of earth's gravitational field ($\cong 9.81$ m/s$^2$). The tool magnetic phase $\phi_m$ is known from the previous step. G $\sin(\alpha_i)$ can be calculated under the assumption that the gravitational component does not contribute to the lateral acceleration of the tool.

Figure 12:
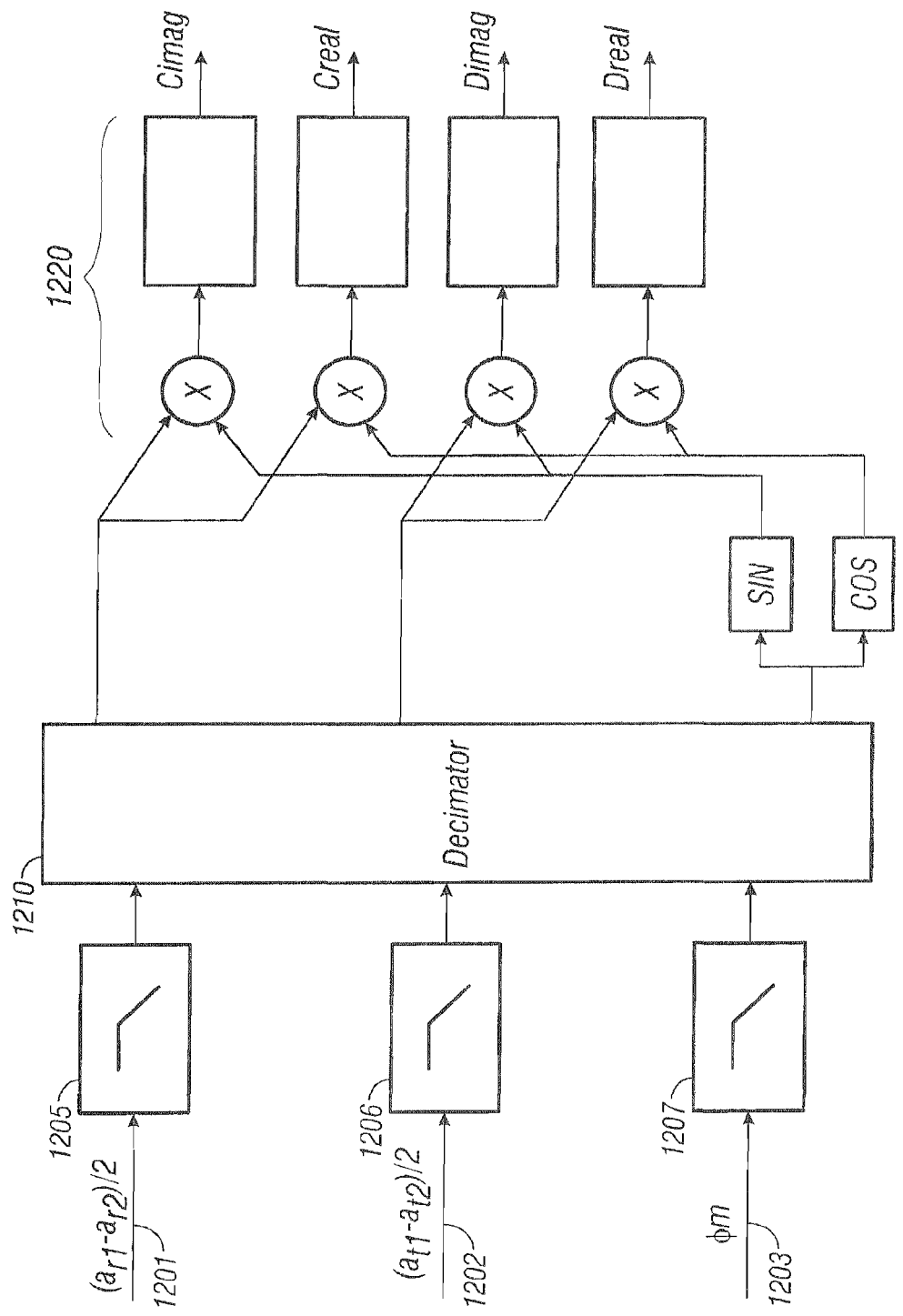
FIG. 12 is a block diagram showing an example process for determining the gravitational component of the acceleration measurements.

As shown in FIG. 12, the acceleration signals 1201, and 1202, with centrifugal component removed, along with the $\phi_m$ phase information 1203, are filtered through substantially identical low-pass filters 1205, 1206, and 1207. In one example embodiment, low-pass filters 1205, 1206, and 1207 may have a cutoff frequency of about 20 Hz. The 20 Hz cutoff is believed adequate to pass all gravity-related components, although it will be appreciated that different frequencies may be used in alternative embodiments.

The signals are then decimated in decimator 1210 and fed into a quadrature detector 1220 known to those skilled in the art. In the quadrature detector both acceleration signals $a_r$ and at are multiplied by the $\sin(\phi_m)$ and $\cos(\phi_m)$. The outputs may be averaged over time (a few seconds in one embodiment) yield two complex numbers c and d, where:

$$c_{real} = \frac{1}{N}\sum_{i=1}^{N} a_{ri}\cos(\phi_{mi})$$

$$d_{real} = \frac{1}{N}\sum_{1}^{N} a_{ti}\cos(\phi_{mi})$$

$$c_{imag} = \frac{1}{N}\sum_{i=1}^{N} a_{ri}\sin(\phi_{mi})$$

$$d_{imag} = \frac{1}{N}\sum_{i=1}^{N} a_{ti}\sin(\phi_{mi})$$

Where,

N is the number of signal samples processed during the averaging;

$a_{ri}$ and $a_{ti}$ are consecutive samples of $a_r$ and $a_t$, respectively; and $\phi_{mi}$ are consecutive samples of $\phi_m$.

Both complex numbers are 90 degrees out of phase since the gravitational component is 90 degrees out of phase in $a_r$ and $a_t$, respectively. The magnitude of these complex numbers equals to $0.5\,G\sin(\alpha_i)$ and the phase of c equals to $\phi_0$, therefore:

$$G\sin(\alpha_i) = 2\sqrt{c_{real}^2 + c_{imag}^2}$$

$$\phi_0 = \operatorname{atan2}(c_{real}, c_{imag}) \quad (6)$$

Once the phase shift $\phi_o$ is found from step (d), combined with the parameter $\phi_m$ known from the previous step, $\phi$ may be calculated according to the relationship:

$$\phi = \phi_m + \phi_0$$

The same information can be obtained from the complex number d, remembering that there is a 90° phase shift between c and d. If the magnitude and phase are obtained from both complex outputs, in one example, it can be averaged to decrease uncertainty.

This process yields both the phase shift $\phi_o$ and magnitude of the gravitational component $G\sin(\alpha_i)$. The time constants of the averaging process can be as long as 30 seconds or more, if the phase information from magnetic sensors is used, since there is no systematic drift between the $\phi_m$ and $\phi$ other than changes of the borehole direction or of the magnetic field, which typically are very slow.

To assess the quality of the real-time data, the standard deviation of each measured/calculated quantity may be determined, if possible. If the same information is available from several sources, the one with the lowest standard deviation may be chosen. Based on individual uncertainty estimates, the uncertainty of velocity determination can be calculated and made available to the computer system for storage.

While phase detection is desirably obtained by using magnetometers, this method is not available when the tool longitudinal axis coincides with the magnetic vector. An alternative, although less accurate method of phase determination using the accelerometer signals, is available in accordance with a specific embodiment of the present invention. According to Eq. (2), the gravitational tool phase $\phi$ can be calculated as an integral of the instantaneous angular velocity $\omega$ which can be determined from Eq. (3) and Eq. (4). It will be appreciated that this approach is sensitive to accelerometer scale error and may suffer from poor resolution of $\omega$ at low speeds. Nonetheless, the approach can serve as a backup algorithm in situations where magnetic information is not available.

(e). Calculate the lateral tool acceleration components in the borehole reference frame and, optionally, correct for the gravitational component, or convert the measurements to the borehole reference frame, or do both.

To obtain lateral accelerations $a_x$ and $a_y$, the raw acceleration signals are subtracted so that centrifugal and angular acceleration components cancel out:

$$\frac{a_{r1} - a_{r2}}{2} = a_x\cos(\phi) - a_y\sin(\phi) + G\sin(\alpha_i)\cos(\phi) \quad (7)$$

$$\frac{a_{t1} - a_{t2}}{2} = a_x\sin(\phi) + a_y\cos(\phi) + G\sin(\alpha_i)\sin(\phi)$$

The signals above also contain the modulated gravitational component $G\sin(\alpha_i)\cos(\phi)$. Since $G\sin(\alpha_i)$ and $\phi$ have been determined in the previous step, the gravitational component can be subtracted from both signals yielding accelerations corrected for gravitational components $a_{rg}$ and $a_{tg}$:

$$a_{rg} = a_x\cos(\phi) - a_y\sin(\phi)$$

$$a_{tg} = a_x\sin(\phi) + a_y\cos(\phi) \quad (8)$$

(f): Transforming the accelerations into the formation reference frame XYZ. Solving Eq. (7), yields:

$$a_x = -a_{rg}\cos(\phi) + a_{tg}\sin(\phi)$$

$$a_y = a_{rg}\sin(\phi) + a_{tg}\cos(\phi) \quad (9)$$

Equation (9) may be used to convert the tool acceleration from the (r-t-a) reference frame to the XYZ borehole reference frame. All variables have been previously determined in order to calculate $a_x$ and $a_y$. Note also that Eq. (9) may be used when no correction is desired for the gravity effect of tool tilt on the accelerometers, and only a conversion to the borehole frame of reference is desired.

(g). Calculate the lateral velocity components by calculating initial velocity and integrating the instantaneous acceleration found in step e.

Knowing $a_x$ and $a_y$ from the previous step, the lateral velocity components $v_x$ and $v_y$ may be calculated. The lateral velocity calculation is provided in a preferred embodiment as follows:

$$\int_{T_0}^{t} v_x(t) = v_{0x}(t - T_0) + \int\int_{T_0}^{t} a_x(t)\,dt^2 \leq \Delta s \quad (10)$$

$$\int_{T_0}^{t} v_y(t) = v_{0y}(t - T_0) + \int\int_{T_0}^{t} a_y(t)\,dt^2 \leq \Delta s$$

where $v_{0x}$ and $v_{0y}$ are unknown initial velocities at arbitrarily chosen time $T_0$. Since the borehole restrains the motion of the tool during any period, the lateral displacement is less than or equal to the slack $\Delta s$ between the drill collar and the borehole wall.

Since values of $a_x$ and $a_y$ are known at any point in time, the initial velocities $v_{0x}$ and $v_{0y}$ can be calculated from:

$$v_{0x} \approx -\frac{\int\int_{T_0}^t a_x(t)\,dt^2}{t-T_0}$$

$$v_{0y} \approx -\frac{\int\int_{T_0}^t a_y(t)\,dt^2}{t-T_0}$$

(11)

with the uncertainty of the measurement method less than $\Delta s/(d-T_0)$. For example, to achieve an uncertainty of 0.02 m/s in a borehole having a slack of 5 cm, the minimum integrating time should be 2.5 seconds.

After the individual lateral velocity components are extracted, the modulus of the lateral velocity may be calculated as:

$$v = v_x^2 + v_y^2 \quad (12)$$

In order to use the velocity calculation as described by equations (10-12) with computer processing, it is desirable to simplify the data processing to minimize the calculations. Thus, assuming a minimum $T_0$ of 2.5 seconds and a sampling frequency of 8 kHz, the number of samples integrated would exceed 20,000. The memory requirement for direct implementation would be substantial. Therefore, in a preferred embodiment, a multiple-window approach is performed, wherein the integrals are calculated over K partially overlapping time windows. The individual samples do not have to be stored, only the integrals and number of samples integrated. When an integrator reaches the preset number of samples, i.e., 2.5 seconds worth of data in a specific embodiment, it becomes the source of velocity information for the system, until the next-in-line integrator reaches the minimum number of samples. Then the first integrator is reset and begins another new integration, while the second integrator provides velocity information. This processing approach tolerates some discontinuity in the velocity signal that is introduced when switching integrators in the Kth increase during processing. However, as simplified using the above approach the calculations are manageable and provide reasonably accurate results. The performance of recursive filters during velocity retrieval may also be tested in a specific embodiment.

Correcting for Tool Motion Distortion

Figure 7:
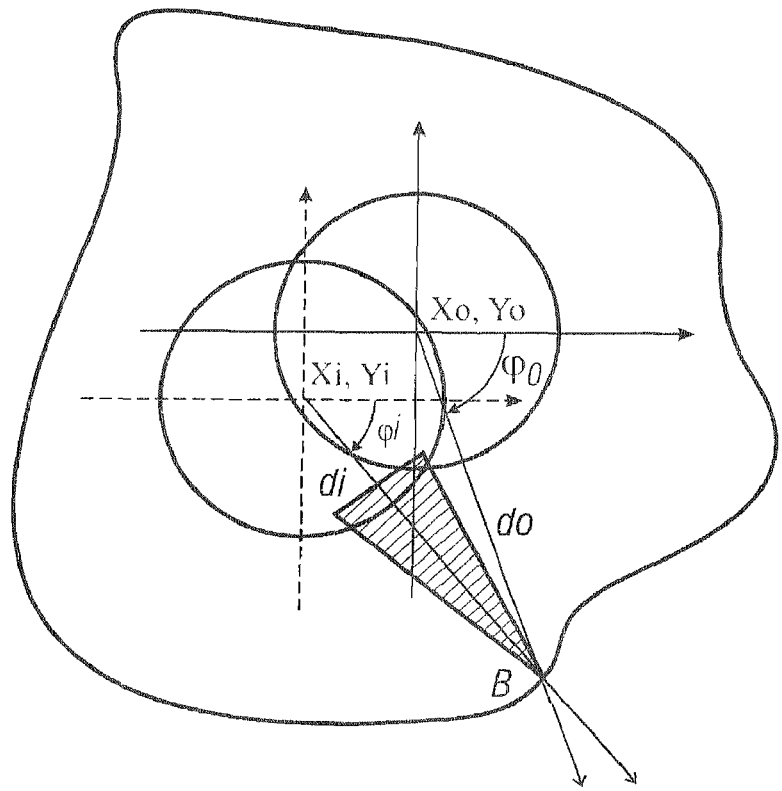
FIG. 7 shows an example of a view of a desired feature at position Xi, Yi.

Referring to FIG. 7, in one example, a measurement done at time $T_i$, when the tool axis is positioned at $(X_i,Y_i)$, yields a time measurement for the time it takes for the signal to travel to the wall and back, where i varies from 1 to n, and n designates the number of measurements taken around the borehole in a single revolution. As indicated above, n may vary between 16 and 256. If the speed of sound of the transmission medium, v, is known, the distance from the transducer to the wall may be calculated. For example, $d_i = v\Delta t/2$, where $\Delta t$ is the total transit time.

Using this calculation, the distance $d_i$ to point B, at tool face $\phi_i$, see FIG. 7, can be determined. However, what is really desired is the distance $d_{o,i}$ and the tool face angle $\phi_{o,i}$ at the reference location $X_0, Y_0$. Through a transformation of coordinate systems, described below, the $T_i$ measurements may be converted to the reference point $(X_0,Y_0)$ yielding a corrected tool face $\phi_{o,i}$ and distance $d_{o,i}$ to target B. If all measurements within each rotation of the tool are corrected in this manner then the borehole shape, as indicated by the corrected distances $d_{o,i}$ will not be distorted by tool motion. The accuracy of the correction is limited by the accuracy of measurement of the tool lateral displacement and the accuracy of the determination of the distance $d_i$. The latter measurement is at least partially dependent on the accuracy of the determination of the sound speed in the drilling fluid transmission medium.

The transformation of reference points can be accomplished by first transforming the polar coordinate measurement $(d_i, \phi_i)$ to Cartesian coordinates in coordinate system originating at $(X_i,Y_i)$:

$x_{Bi} = d_i \cdot \cos(\phi_i)$ $y_{Bi} = -d_i \cdot \sin(\phi_i)$

Subsequently origin translation is applied yielding Cartesian coordinates of point B in coordinate system originating at (XoYo):

$x_{B0i} = x_{Bi} + \Delta X_i$ $y_{B0i} = y_{Bi} + \Delta Y_i$

Where $\Delta X$ and $\Delta Y$ are the translations for X and Y respectively.

$\Delta X_i = X_i - X_0$ $\Delta Y_i = Y_i - Y_0$

Finally, the conversion to polar coordinates is done:

$$d_{0i} = \sqrt{x_{B0i}^2 + y_{B0i}^2}$$

$$\varphi_{0i} = \arctan\left(\frac{y_{B0i}}{x_{B0i}}\right)$$

A 4-quadrant resolved arc-tangent calculation may be used in the above equation and the singularity at $x_{B0}=0$ may be resolved using commonly known techniques known in the art.

Figure 8:
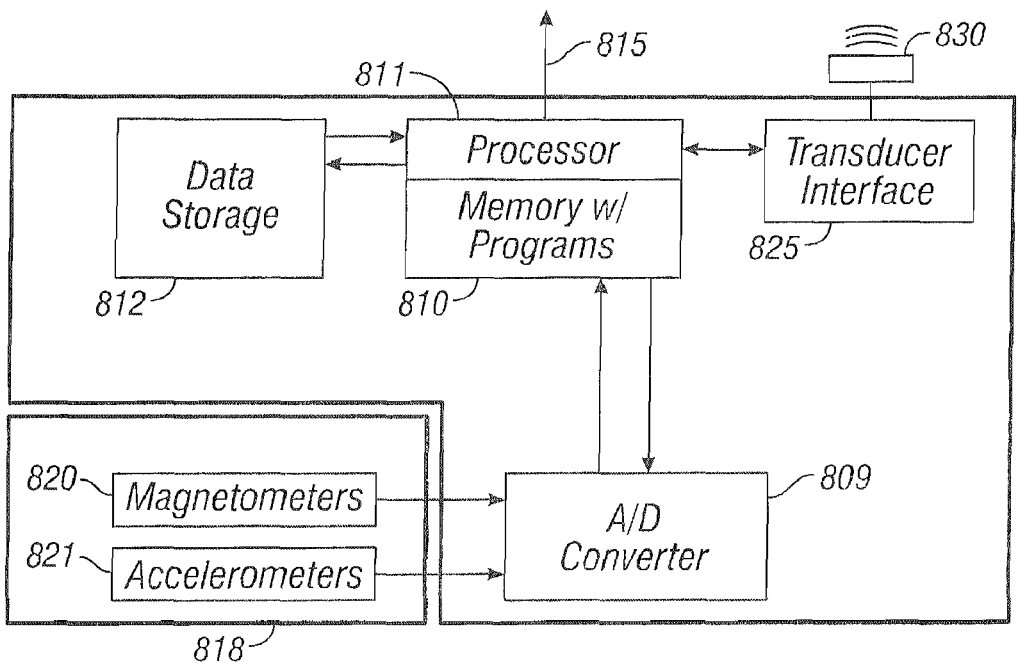
FIG. 8 discloses one example embodiment of a controller located in a downhole imaging tool.

In one embodiment, the calculation transformation of the measured data to the reference point, described above, may be programmed as instructions for execution by a controller located downhole and/or at the surface. FIG. 8 discloses one example embodiment of a controller 800 located in the downhole imaging tool 200, see FIG. 1. Alternatively, the imaging tool may be controlled by controller 150 in BHA 100. Controller 800 comprises a processor 830 in data communication with memory 810 and data storage device 812. Processor 811 may be a microcomputer, a microprocessor, or any other suitable calculation device suitable for downhole use. Memory 810 may be located onboard processor 811 or alternatively may be external to processor 811. Memory 810 may comprise EPROM, EEPROM, flash memory, or any other memory device suitable for downhole use. In the embodiment shown, data storage device 812 may be separate from memory 810 and comprise EPROM, EEPROM, flash memory, or any other memory device suitable for downhole use. Alternatively, data storage device 812 and memory 810 may be integrated together. Data storage device 812 may be used to store raw and/or processed data for archival purposes and/or for further processing at the surface. Directional sensor 818 may comprise magnetometers 820 and accelerometers 821 in data communication with controller 800, for example though A/D converter 809. Alternatively, directional sensor 818 may include suitable gyroscopic devices for directional sensing. Transducer interface 825 is also in data communication with processor 811. Transducer interface 825 comprises suitable power and triggering circuitry for activating transducer 830 and for receiving reflected signals from the borehole wall. In one example, memory 810 contains suitable program instructions, that when executed, calculate the corrected $d_{0i}$ and $\phi_{0i}$ as described above. In one embodiment, the corrected values of $d_{0i}$ and $\phi_{0i}$ are stored in data storage device 812 in relation to depth and/or time of acquisition for further processing at the surface. The corrected $d_{oi}$ values from each successive scan may be plotted as a function of toolface $\phi_{oi}$ to generate an image of the borehole wall.

Figure 9:
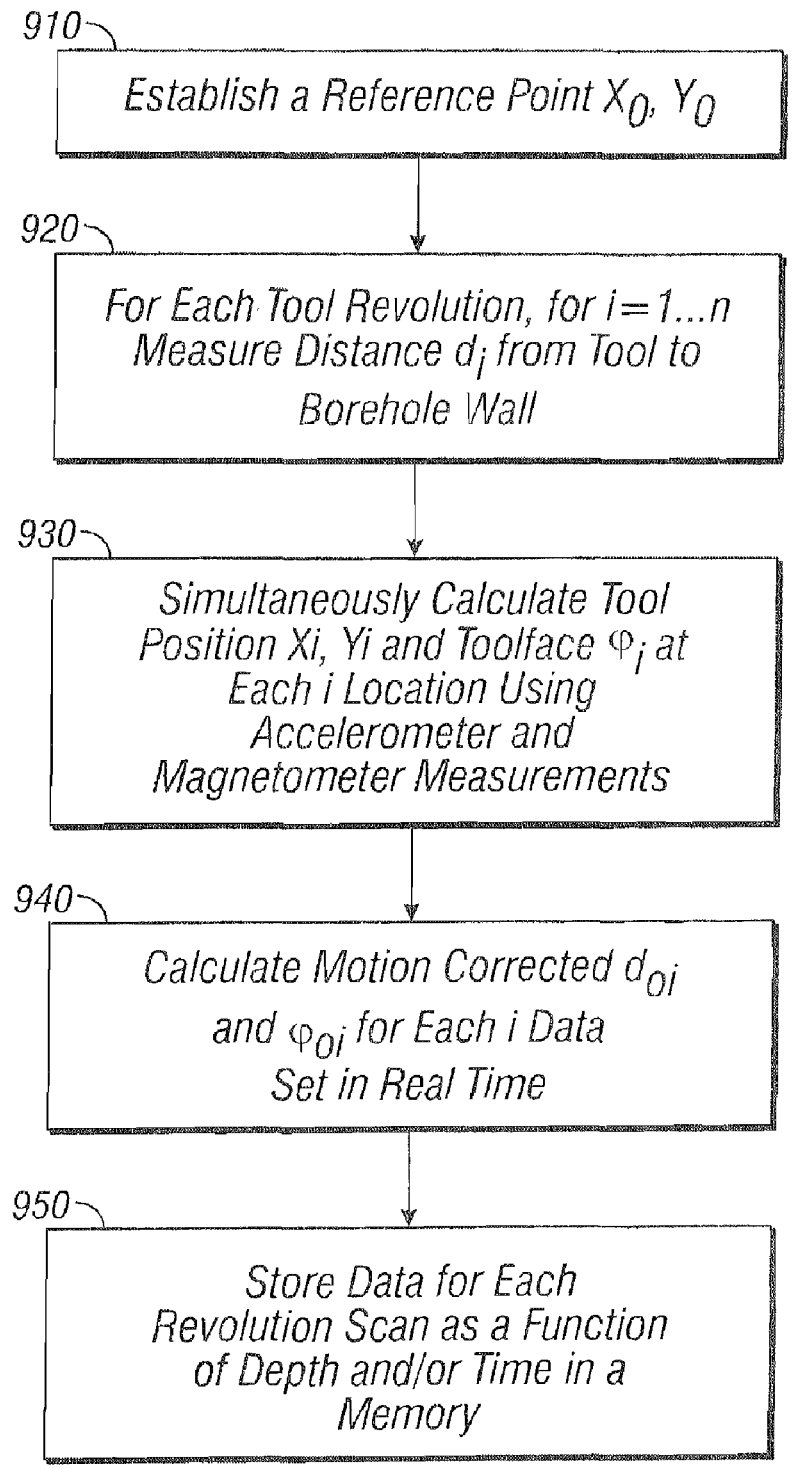
FIG. 9 is a flow chart of a method for correcting motion related distortions in an imaging tool.

FIG. 9 shows a flow chart for determining corrected values of $d_{oi}$ and $\phi_{oi}$ using the described method. In logic box 910 a reference point is established in the borehole. In one example, this may be an arbitrary virtual reference point. Alternatively, a recent measurement point may be used, or an average of recent points may be used.

In logic box 920, for each tool revolution, also called a scan, the uncorrected distance $d_i$ is measured at a number of rotational positions i=1 . . . n, where n is the number of samples per revolution. Substantially simultaneously, in logic box 930, the tool position $X_i$, $Y_i$ and toolface $\phi_i$ are calculated using accelerometer and magnetometer measurements.

In logic box 940, a corrected $d_{oi}$ and $\phi_{oi}$ are calculated for each i data set, in real time. In logic box 950, corrected data for each revolution scan may be stored in a downhole memory as a function of depth and/or time. Such data may be transmitted to the surface using the MWD telemetry system and assembled into a borehole image log. Alternatively, the corrected data may be retrieved at the surface and assembled into a borehole image log.

While the above process describes downhole processing to calculate corrected data sets, one skilled in the art will appreciate that the raw distance measurements as well as the accelerometer and magnetometer readings may all be stored in downhole memory and processed upon retrieval at the surface.

In one embodiment, the motion correction technique disclosed above may be embodied as a set of instructions on a computer readable medium comprising ROM, RAM, CD, DVD, hard drive, flash memory device, diskette, and any other computer readable medium, now known or unknown, that when executed causes a processor, for example processor 811, to implement a method of the present disclosure. For example, in one illustrative embodiment a computer readable medium contains a set of executable instructions that when executed by processor 811 performs a method for correcting distance measurements from an imaging tool to a borehole wall. The method comprises executing a program such that hardware and software in controller 800 executes a logic sequence as illustrated in boxes 910-950 as described above to generate corrected distance measurements. Alternatively, the instructions on the computer readable medium may be executed at the surface, for example, on surface controller 120.

While described above in reference to acoustic imaging measurements, the motion correction of sensor measurements described above may be applied to other sensor measurements. Measurements that typically require a stable positional reference during the measurement period may be correctible using the present invention. For example, magnetic resonant imaging (MRI) logging tools may require tool motion to be less than 0.1 mm relative to the borehole within a measuring time of 500 µs for accurate measurements. Tool displacements of 0.25 mm may introduce substantial errors in the MRI signal. In addition, such movement may substantially reduce the signal to noise ratio. By correcting the MRI measurements to the reference location, improved MRI imaging may be produced. MRI tools are known in the art and will not be described here in detail. Other parameters of interest amenable to such corrections include, but are not limited to, formation resistivity measurements, including electromagnetic resistivity, and formation nuclear porosity and density measurements.

Figure 11:
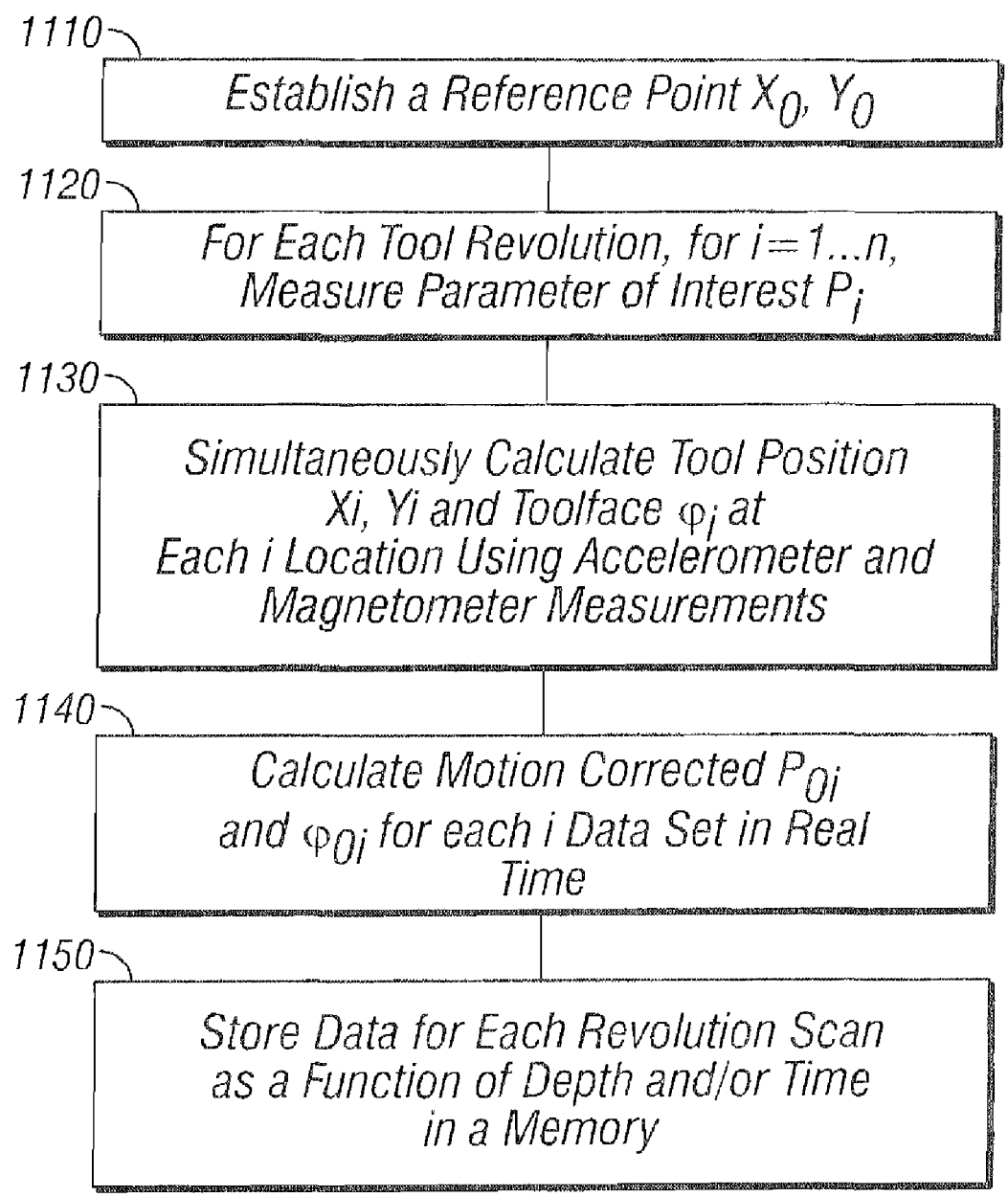
FIG. 11 is a flow chart of a method for correcting motion related distortions in a measurement of a parameter of interest.

FIG. 11 shows a flow chart for determining corrected values of parameter of interest $P_{oi}$ and $\phi_{oi}$ using the described method. In logic box 1110 a reference point is established in the borehole. In one example, this may be an arbitrary virtual reference point. Alternatively, a recent measurement point may be used, or an average of recent points may be used.

In logic box 1120, for each tool revolution, also called a scan, the uncorrected parameter of interest $P_i$ is measured at a number of rotational positions i=1 . . . n, where n is the number of samples per revolution. Substantially simultaneously, in logic box 1130, the tool position $X_i$, $Y_i$ and toolface $\phi_i$ are calculated using accelerometer and magnetometer measurements.

In logic box 1140, a corrected $P_{oi}$ and $\phi_{oi}$ are calculated for each i data set, in real time. In logic box 1150, corrected data for each revolution scan may be stored in a downhole memory as a function of depth and/or time. Such data may be transmitted to the surface using the MWD telemetry system and assembled into a borehole image log. Alternatively, the corrected data may be retrieved at the surface and assembled into a borehole log.

While the above process describes downhole processing to calculate corrected data sets, one skilled in the art will appreciate that the raw parameter of interest measurements as well as the accelerometer and magnetometer readings may all be stored in downhole memory and processed upon retrieval at the surface.

Correction of Motion Related Distortions of Echo Amplitude and Phase

While the concept described here can be applied to non-acoustic methods this text refers, for clarity, to an ultrasonic transducer. Assuming that the tool position within the borehole is known at any time, the drilling fluid attenuation constant, $\alpha$, and the drilling fluid sound velocity, v, are needed in order to compensate changes of reflected echo magnitude and phase due to increases in path length caused by tool movement. As used here, the phase refers to the change in phase angle of the reflected signal with respect to the originally transmitted signal. While these fluid acoustic properties may not remain constant during drilling operation, their variations will usually be relatively slow in relation to a measurement cycle. For example, the drilling fluid properties may change in a timeframe of minutes as compared to a measurement timeframe of seconds. Using the natural movement of the tool during drilling operation, combined with statistical data analysis, $\alpha$ and v may be determined and subsequently used to correct the effects of tool motion.

Determination of the fluid acoustic properties depends on the following assumptions being met:
- the lateral movement of the tool within the borehole can be measured accurately;
- the occurrences when the imaging transducer substantially points at the same point on the borehole wall during successive revolutions (scans) can be detected;
- the axial rate of penetration (drilling speed) is low making subsequent scans of the borehole highly correlated with each other (i.e. in a majority of measurements over a reasonable time period the acoustic impedance contrast at point B (FIG. 7) will not change appreciably between consecutive scans).

The method involves:
1. Stringing the $(\phi_1, d_1, \phi_0, d_0)$ arrays for each pair of consecutive scans (tool rotations) along with the corresponding signal amplitude and phase (A, Θ). For the purpose of this description these two scans will be identified as T1 and T2, as they occur at different times.

2. Locating data samples in scans T1 and T2 with substantially matching toolface, $\phi_0$, which indicates that the imaging transducer is pointing at substantially the same location on the borehole wall, regardless of possible movement of the tool.

3. Compare $d_1$, measurements (distance of the sensor from measurement point B at the time of measurement) of the matched data points. If the magnitude of the measurement distance between consecutive scans $d_{1,T1}$ and $d_{1,T2}$ is different by more than a predetermined value $\Delta d$, then a two point method may be used to estimate the mud attenuation constant, $\alpha$, and sound velocity, v, at the operating frequency using the amplitude and phase differences of measurements done at $d_{1,T1}$ and $d_{1,T2}$. In one example, the value of $\Delta d$ may be about 1 mm. Assuming the condition is met, then $$v \approx \frac{2 \cdot \omega \cdot (d_{1,T1} - d_{1,T2})}{\Theta_{T1} - \Theta_{T2}}$$

$$\alpha \approx \frac{10 \cdot \log_{10}\left(\frac{A_{T1}}{A_{T2}}\right)}{2 \cdot (d_{1,T2} - d_{1T1})}$$

where $\omega$ is the angular frequency of the transmitted signal and the factor of 2 in the above formulas is related to the path of the reflected sound wave changing by twice the difference in the distance to target B. $\Theta_{T1}$ and $\Theta_{T2}$ denote the phase of the acoustic echo received while $A_{T1}$ and $A_{T2}$ are the amplitudes at times T1 and T2 respectively, When estimating velocity, the possibility of phase changes of more than $2*\pi$ radians may occur if the tool moves by more than a wavelength of the ultrasonic signal. This situation can be detected and addressed by using the time of flight measurement and $\Delta d$ along with the last estimate of the velocity. The calculation above also assumes that the portion of the energy reflected off the borehole does not change substantially between measurements. If that condition is not satisfied, then the estimate of $\alpha$ may not be accurate. The uncertainty of mud parameter estimates may increase if the lateral movement of the tool is small. However, in that situation the amount of correction needed is small as well and the errors will not propagate to the final result.

4. Assembling a histogram of distributions of $\alpha$ and v over a period of time (for example 10 minutes). The measurements where essentially the same point on the borehole wall was sampled in consecutive scans, while the distance to borehole changed due to tool motion, will form a major peak in the distribution. However, the measurements that fall on a fracture, or are otherwise distorted, will be scattered. The effectiveness of this method can be enhanced further by applying weights to each measurement based on an uncertainty estimate, for example, by taking into account the amount of displacement between T1 and T2.

5. Determining $\alpha$ and v based on the highest peak in the distribution. A median filter to eliminate outliers and mean of the population may be applied. If the calculated $\alpha$ and v are different from the previously used values, the new $\alpha$ and v may be used in the correction of the $d_{1i}$ measurements in the technique described previously for correcting the image for artifacts related to tool motion.

Figure 10:
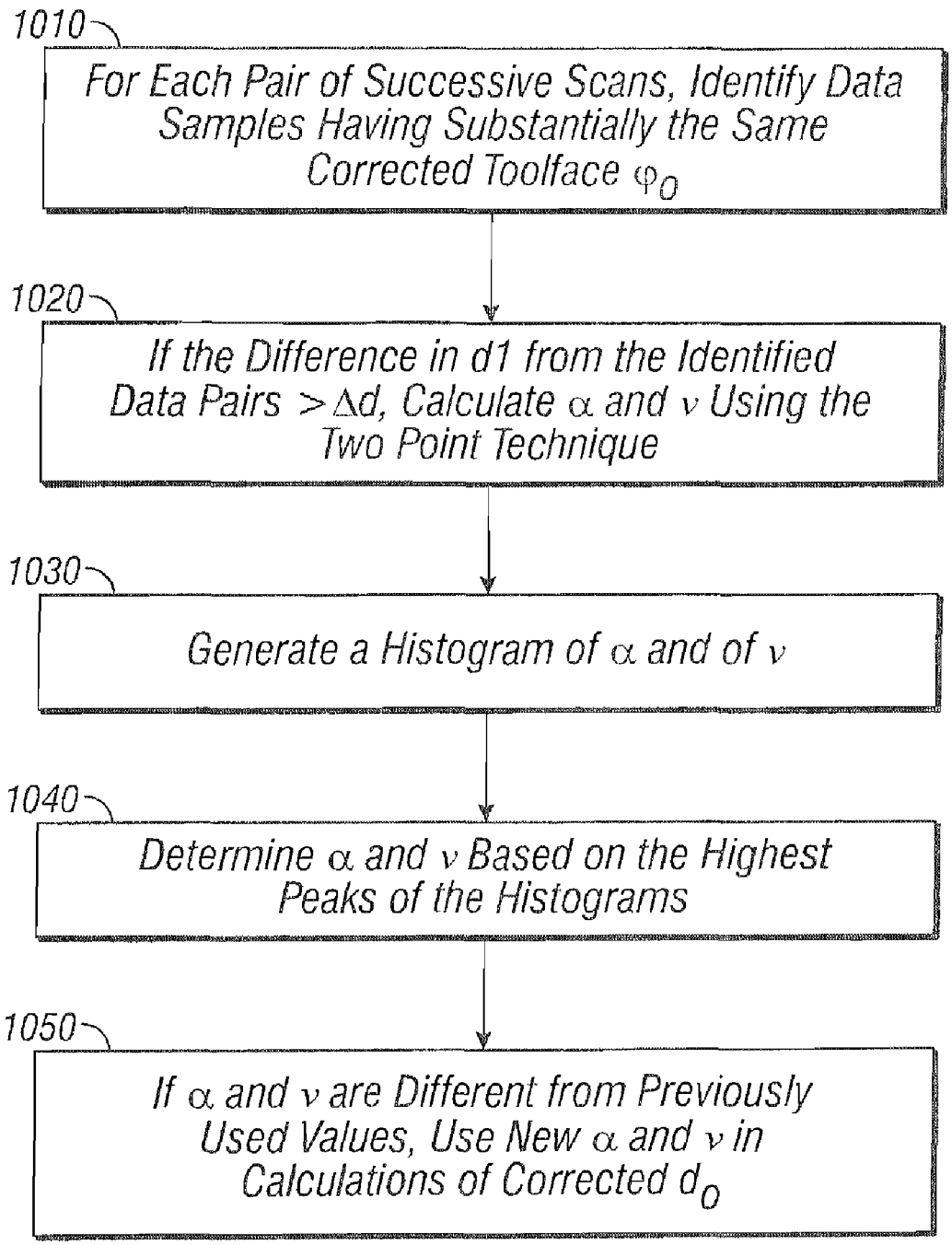
FIG. 10 is a flow chart for determining acoustic properties of a fluid.

FIG. 10 shows a flow chart for determining corrected values of $\alpha$ and v using the data acquired in determining motion corrections described previously. In logic box 1010 for each pair of successive scans, identify data samples having substantially the same corrected toolface $\phi_0$. In logic box 1020, determine the difference in $d_1$ values between successive scans. If the difference is >$\Delta d$, calculate $\alpha$ and v using the described two point technique.

In logic box 1030, generate histograms of calculated $\alpha$ and of v values for the successive scan pairs. In logic box 1040, determine $\alpha$ and v based on the highest peaks in each histogram. In logic box 1050, if $\alpha$ and v are different from previously used values, use the new values in subsequent calculations of corrected $d_0$. In one embodiment, instructions enabling the determination of $\alpha$ and v, as described above, may be stored in downhole memory 810 for execution by processor 811 in controller 800. The calculated $\alpha$ and v values determined therefrom may be used in calculating corrected measurements downhole. Alternatively, the calculated $\alpha$ and v values may be stored in memory 810 and retrieved at a later time for correction of parameter measurements.

In one embodiment, the calculation technique for $\alpha$ and v disclosed above may be embodied as a set of instructions on a computer readable medium comprising ROM, RAM, CD, DVD, hard drive, flash memory device, diskette, and any other computer readable medium, now known or unknown, that when executed causes a processor, for example processor 811, to implement a method of the present disclosure. For example, in one embodiment a computer readable medium contains a set of executable instructions that when executed by processor 811 performs a method for calculating values of $\alpha$ and v. The method comprises executing a program such that hardware and software in controller 800 executes a logic sequence as illustrated in boxes 1010-1050 as described above to generate $\alpha$ and v measurements to account for changes in drilling fluid properties downhole. Alternatively, the instructions on the computer readable medium may be executed at the surface, for example, on surface controller 120.

Examples of Acoustic Transducers

Figure 13A:
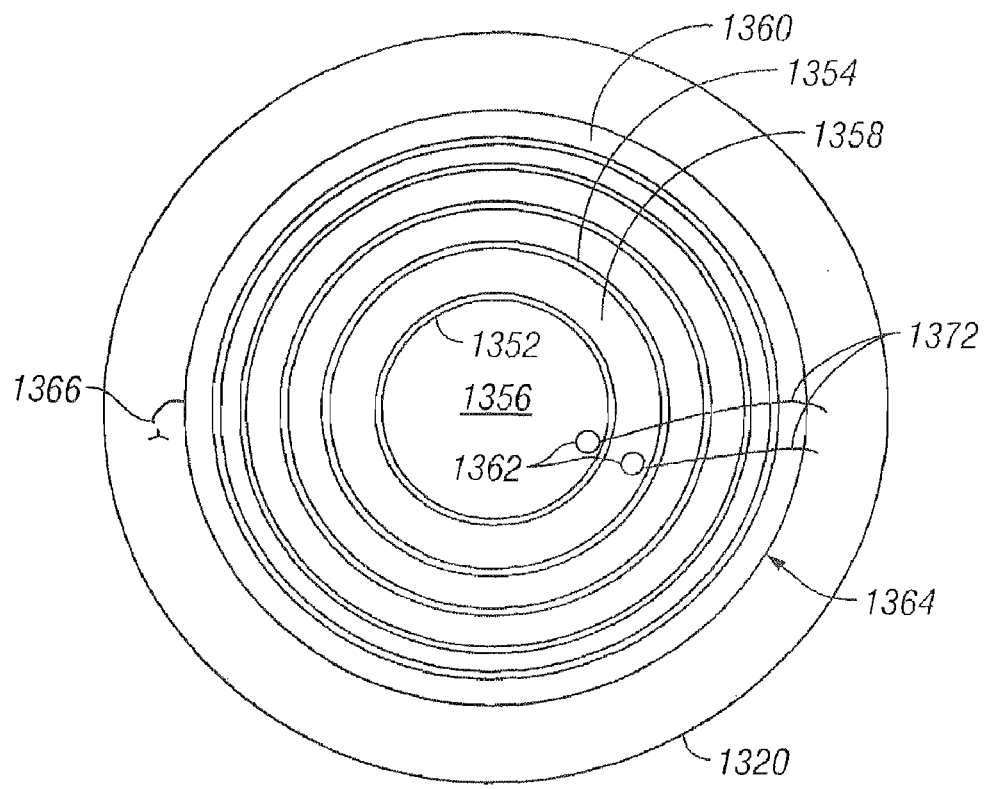
FIGS. 13A and 13B are views of an example acoustic transmitter element having several grooves cut therein to define concentric rings for transmitting purposes.
Figure 13B:
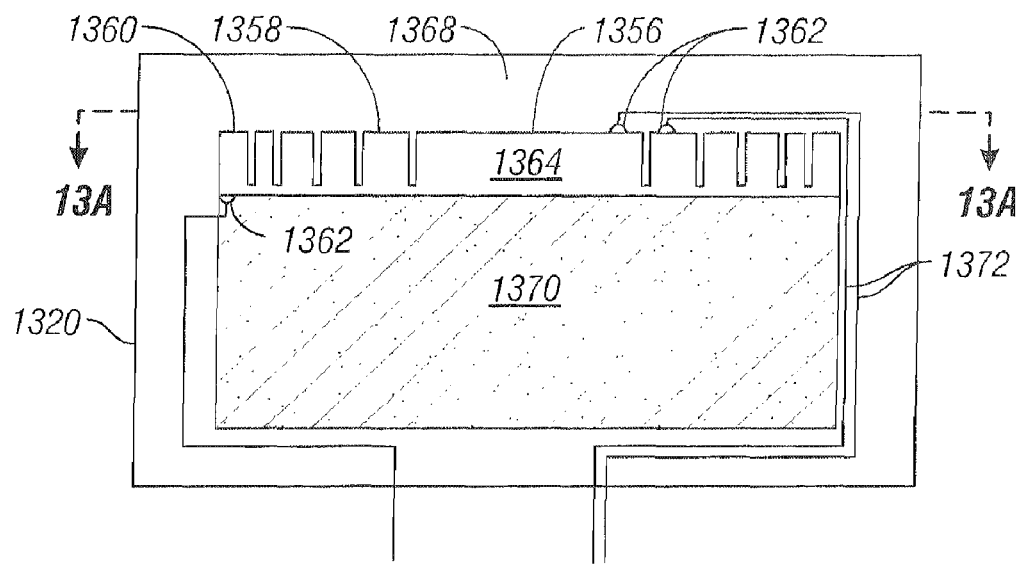

In one example, a dynamically focused acoustic transducer 1320, shown in FIGS. 13A and 13B, comprises a circular piezoelectric disk member 1364. It is poled in the thickness mode, typically having both flat surfaces coated with a conducting metal electrode. It may have a solid backing 1370 which acts as a highly attenuating medium absorbing the acoustic energy which is radiated into it. The ceramic and backing are housed in an epoxy material 1368 having a thickness separating the ceramic from the borehole fluid by a quarter wavelength. This material 1368, having a proper acoustic impedance, is a well known technique for improving the transfer of acoustic energy from the ceramic which has a high impedance to the water (mud) which has a lower impedance. The ceramic is cut with a plurality of circular grooves at 1352 and 1354. These grooves typically do not fully penetrate the ceramic device for ease of manufacturing. Rather, they define ring shaped surface areas and provide acoustic as well as electrical isolation between the individual elements. Inside the smallest ring shaped surface 1358 is the center disk 1356. This pattern continues to the outer ring shaped area 1360. Electrical attachments are made to the ceramic using solder or conductive epoxy. The ground electrode 1366 is attached before the ceramic is bonded to the backing material. Each of the rings is attached at 1362 to conductors 1372 using either solder or conductive epoxy. The wires, now attached to the various rings, and a single ground electrode are preferably led to the back of the transducer, being held in place by the surrounding epoxy housing 1368. The total number of ring shaped areas is $N_{ring}$ where $N_{ring}$ is a whole number integer. Moreover, $N_{ring}$ is typically in the range of about three at the low end, and increases up to about ten. In theory, $N_{ring}$ can increase further, but there is a practical limit in the benefit obtained by increasing $N_{ring}$. The optimum number for $N_{ring}$ is about four to eight. In one embodiment, the rings are not evenly spaced radially but are spaced based upon a more subtle criterion. They are spaced such that when focused at the minimum range, the difference in time delay required for each ring is a fixed value. This procedure simplifies the electronics components somewhat. The delay differences for all of the ranges may be kept the same simplifying the electronic design. Even if respective delays are slightly imperfect, there is little degradation in the resulting focusing. There are obviously other methodologies which may be used to select the spacings of the rings. Modeled responses of transducers indicate that the maximum time delay from one ring to the next when forming a focus is related to the frequency such that the time delay should be less than or equal to 90 degrees.

Figure 14A:
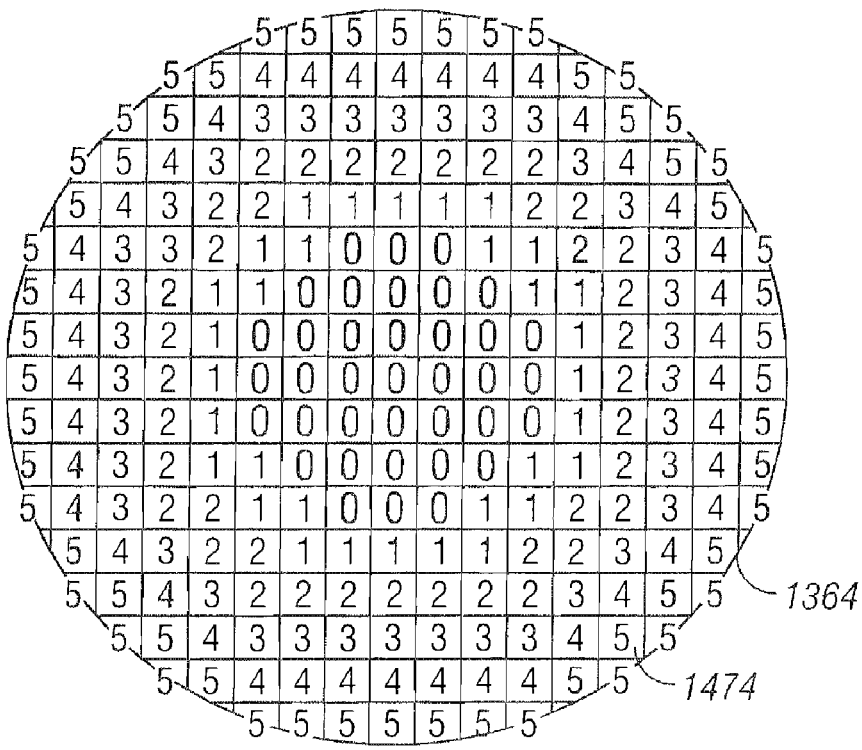
FIGS. 14A and 14B show an alternate acoustic transmitter element utilizing square cuts in the ceramic member.
Figure 14B:
Figure 14C:
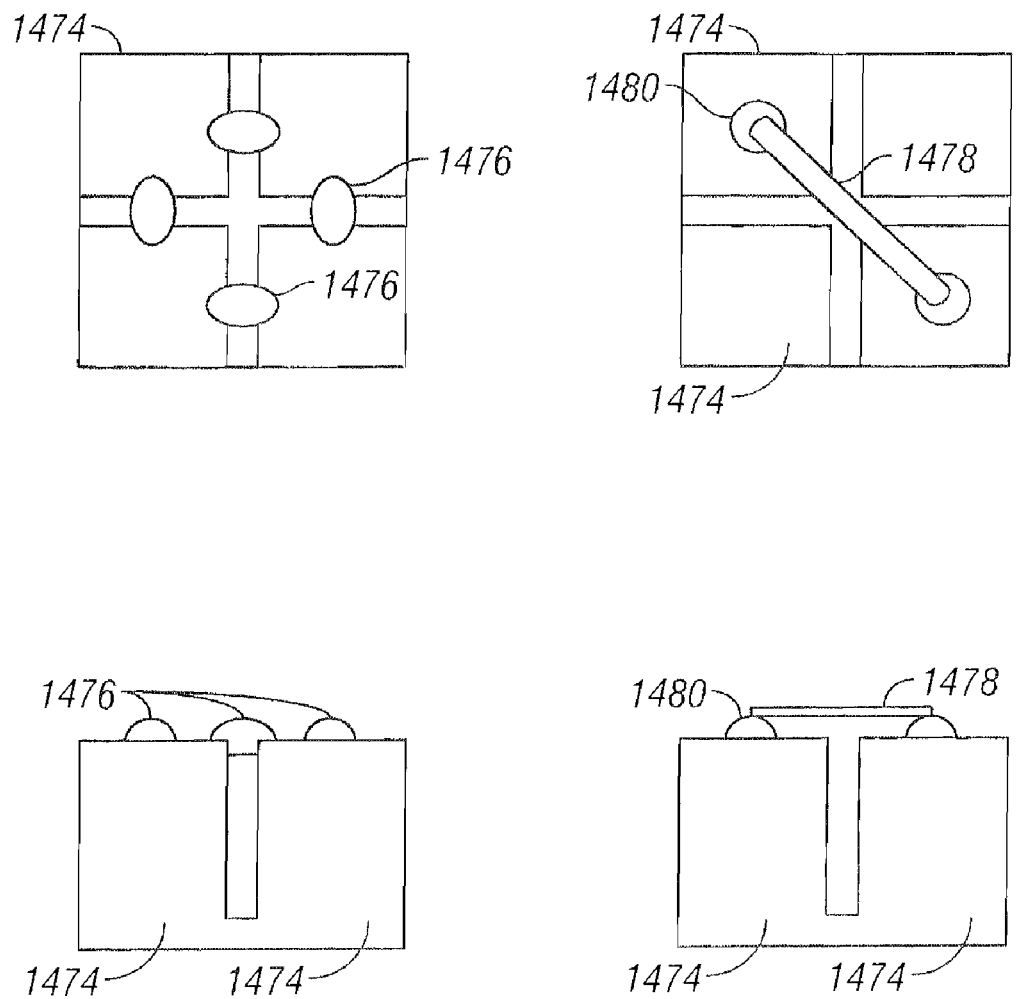
FIG. 14C shows the electrical connections of the square elements of FIGS. 14A and 14B in a manner to approximate the rings of the transmitter element of FIGS. 13A and 13B.

FIGS. 14A and 14B show an alternate method for defining the ring shaped pattern on the ceramic element 1364. The ceramic 1364 is cut into square elements 1474. The individual elements are then connected to form a set of interconnected areas simulating a ring shaped area. One example is as shown where the elements all labeled 0 are connected together. Likewise, all elements labeled 1 are connected, and so on, through the elements labeled 5. This method of construction has several advantages over the simple ring configuration. The straight lines are easier to cut using standard production tools. In the previous design, each of the rings has a slightly different resonant frequency because their geometries are each slightly different. The differences in frequency, slightly reduce the imaging resolution of the transducer. The cuts are again 90 percent of the way through the solid ceramic body and are preferably 0.6 times the thickness of the ceramic in spacing. The electrodes of the individual square elements 1474 are connected in FIG. 14C using small beads of silver epoxy, 1476 to connect the correct pattern of square surfaces. Where a diagonal connection is required, a wire 1478 is placed across the diagonal and silver epoxy 1480 is used to bond it to the square element 1474 and hold it above any elements which it crosses without connection. The wires to the electronics are attached as shown in FIGS. 13A and 13B. The resonant frequency of each square element is the same but slightly lower than the basic thickness resonance of the disk. The result is that each ring formed by the set of squares has the same resonant frequency and mechanical Q. Each of the rings therefore behaves almost identically in their source and receiver characteristics.

Figure 15:
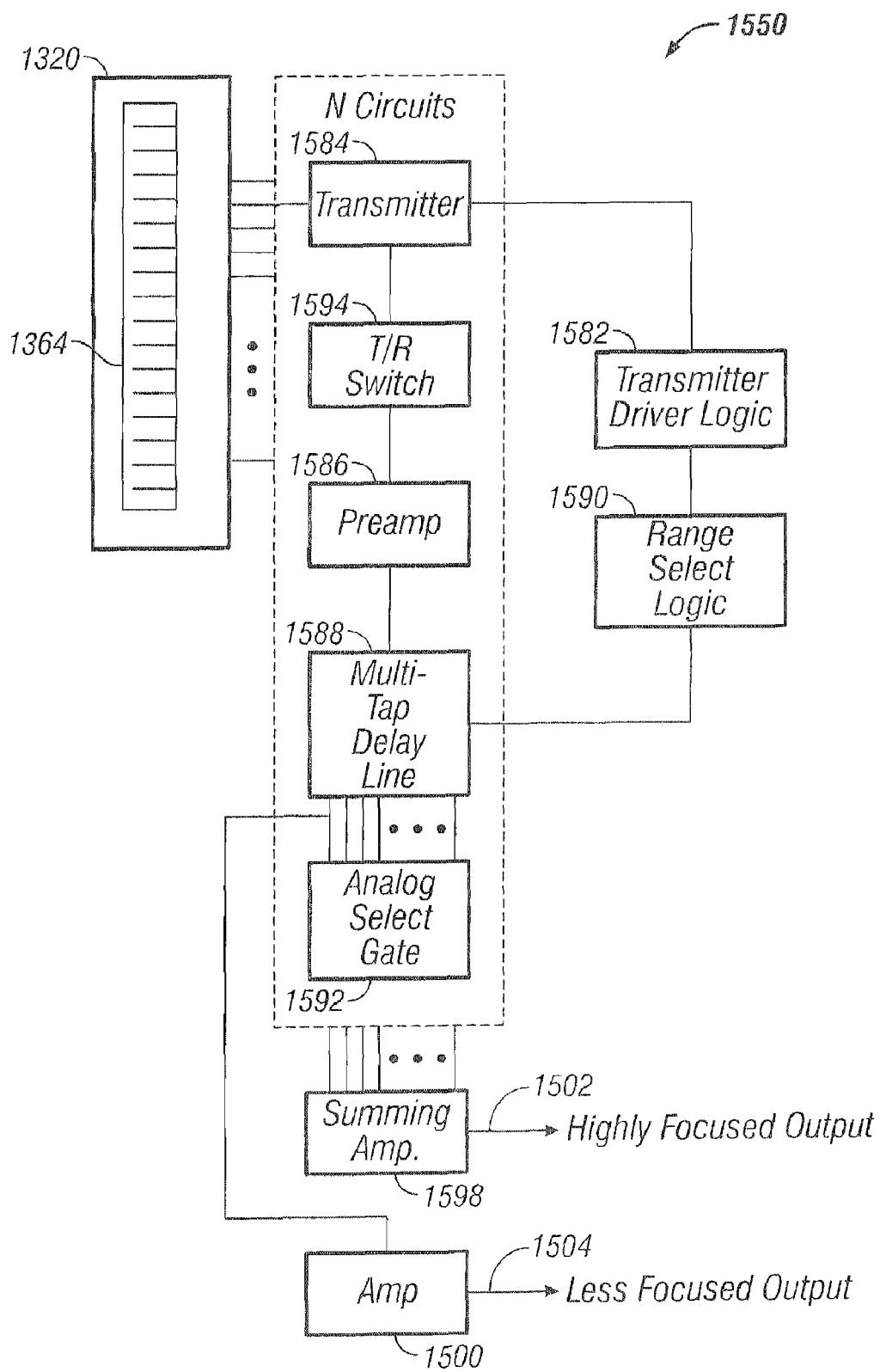
FIG. 15 is an electronic schematic block diagram showing the components of a transducer system.

Each of the rings 1356, 1358 and 1360 shown in FIG. 13A ranging from the smallest on the inside to the largest on the exterior is used as a separate transmitting transducer. They are connected to their own dedicated transmitter and receiver units. This is better shown on review of FIG. 15 of the drawing where the electronics is shown. First of all, the electronics in FIG. 15 comprise N duplicate circuits. Thus, if there are six rings in the acoustic transducer assembly, then six duplicate circuits are provided. The description set forth herein below can therefore be extended to all of the N circuits. The acoustic electronics 1550 incorporates range select logic 1590 which determines the focal distance of the transducer, both for the transmit mode and the receive mode. The transmit focus may be controlled independently from the receive focus. The transmit focal distance is sent to the timing driver logic 1582 which controls the N signals going to each of the N transmitter circuits 1584. In its simplest format the transmit pulse is delayed by the decrease in travel time required for the acoustic energy to propagate from each ring to the desired focal depth as the ring diameter decreases. The outer ring typically has no delay, and the inner disk has the most delay. The signal out of the transmitter circuit 1584 may be either a single pulse or a burst signal. In one example, the transmitted signal is substantially at the resonant frequency of the transducer. The N transmit-receive switches 1594 are used to protect the N preamp circuits from the high voltage transmit pulse on the ceramic. The preamps 1586 have typically 20 dB of gain to get the signal level up to a suitable level and have a lower output impedance than the ceramic, allowing them to drive the delay lines 1588. The N multiple tap delay lines are used to compensate for the travel time differences of the signal at some focal distance propagating to each ring of the transducer. Again the signal from the center disk will typically be delayed the most since it will be the closest to the focus, and the outer ring signal will be delayed the least since it is the farthest from the focus. As the focal distance increases, the total range of delays decreases. The outputs of the taps of the delay line go into N sets of analog select gates 1592. Although an arbitrarily large number of taps may be used, a number of from 3 to 10 is sufficient. This gives from 3 to 10 discrete focal distances for the transducer. The tap selection and thusly the receiver focal distance is controlled by the range select logic 1590. The delay taps are thus selected such that the N signals coming from a chosen focal distance all appear at the outputs of the N analog select gates simultaneously. The N signals are summed in the summing amplifier 1598 to produce the focused signal output 1502. A second output 1504 is also made available which is the signal from only the center element. The peak of the envelope of the signal 1502 forms the amplitude signal. The time location of the onset of this signal is used to derive the travel time, indicating the range to the borehole wall.

Alternatively, one skilled in the art will appreciate that the functionality of analog components comprising multi-tap delay line 1588, analog select gate 1592, summing amplifier 1598, range select logic 1590 and transmitter driver logic can be implemented using a Digital Signal Processor (DSP) operating on digital samples of the signal acquired with an Analog to Digital Converter.

Figure 13C:
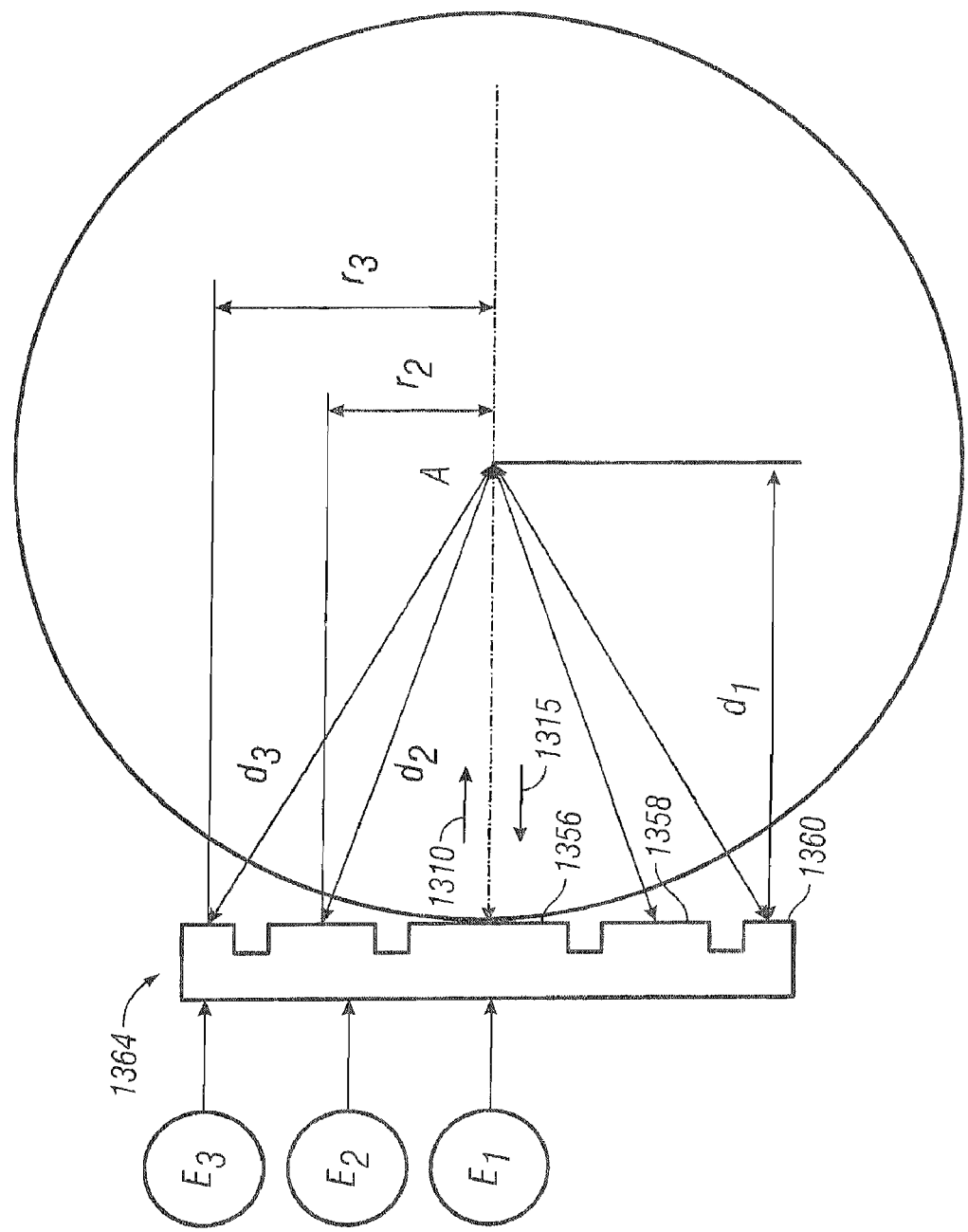
FIG. 13C shows characteristic dimensions of a multi-ring transmitter transmitting to a target.

In one example, the transmitted signal may be a narrow band signal. Using narrow band pulses may reduce spurious resonances and effects of dispersion in the measurement. In one embodiment, the individual rings of FIGS. 13A, B and the virtual rings of FIGS. 14A, B may be activated in a manner to generate a phased array. Using the rings of FIGS. 13A, 13B, and 13C as examples, the individual rings 1356, 1358, and 1360 of transducer 1364 may be excited by voltages $E_1 \ldots E_n$, where $E_1$ is the center electrode and $E_n$ the outermost one. Similarly, the reflected signal detected by the corresponding rings is R1 . . . Rn, where R1 refers to the center electrode signal. Signal 1310 is transmitted from center ring 1356 to a surface located at A, and a reflected signal 1315 is returned. Similar signals are transmitted from each ring and reflected from a surface at A back to the respective ring. The following assumptions are made:
1. the sound velocity at the operating frequency is known based on either previous characterization of the fluid or measured based on motion and reflection time data; and
2. refraction is negligible at the sensor surface for both signals emitted from and received by the sensor.

In addition, the following quantities are assumed known:
a. Distance $d_0$ to the focal point A;
b. Average radii of the sensor electrodes $r_1, r_2, \ldots, r_n$;
c. Number of transducer electrodes (n);
d. The sampling frequency Fs, is assumed the same for acquisition and excitation for the purposes of this example. However, the excitation and acquisition sampling rate can be different if this fact is reflected in the formulas calculating the excitation waveforms and filter coefficients below.

e. There is substantially no coupling between transducer rings. If electromechanical coupling is significant it may be possible to modify the excitation waveforms such that a portion of the excitation signal from a neighboring ring is injected with a proper phase shift such that the direct coupling is actively cancelled.

The narrow band burst pulse excitation waveform may be constructed based on the sensor geometry, distance to target and sound velocity as described below:

1) The distance to target A from each sensor ring is calculated as the square root of the sum of squares of the center distance to the target and the average ring radius. For example, for a center distance to the target of 1.5 cm and ring radius of 1 cm the distance to the target from that ring is sqrt(1^2+1.5^2)=1.8 cm.
2) Based on the distance difference between each ring using the distance calculated in 1) above and the distance to the center ring, and the velocity, a time delay (how much later will the pulse arrive at focal point if fired at the same time from transducer) for each wave front may be calculated as compared to the center electrode (the delay for center electrode is always zero as this is the reference point). For example, if the sound velocity is 1500 m/s and distance to the target from the center electrode is 5 cm while the distance to the target from ring 1358 is 6 cm then the delay for ring 1358 is (0.06−0.05)/1500=6.6 us.
3) The duration of the excitation pulse is selected, using a full number of excitation waveform periods, NPer, at a given excitation Frequency, F. The maximum pulse duration is related to the minimum distance to the target and a minimum dump time Tdump (time needed to attenuate crystal vibrations below the level of a received signal) as follows:

$NPer/F + Tdump + T_{delay,max} < (2*d1)/v$ where $T_{delay,max}$ is the maximum value of wave front delay (delay calculated in step 2 for the outermost ring) If the relationship above is not met, then the piezoelectric crystal ring-down might interfere with the received signal. In general, it is beneficial to make the NPer as high as possible for given system requirements so the transmit and receive bandwidth is minimal.
4) The transmitted pulses and the receiver filters are constructed on a common time base T that has a sampling period 1/Fs (Fs is the sampling frequency). The total length of the time base should be sufficient to handle the longest expected pulse duration+longest pulse delay. Note, pulse delay increases as the distance to target increases. Therefore the estimation should be done for the given sensor geometry and shortest focal length and slowest medium (lowest sound velocity expected).
5) The excitation pulse is generated as:

$E(j) = \sin(2*\pi*F*(T-(T_{delay,max}-T_{delay,j})) * \text{envelope}(T(T_{delay,max}-T_{delay,j}))$ where:
j—is the ring electrode index
F—operating frequency in Hz
T—time base as described above in seconds
$T_{delay,max}$—sound front delay for the outermost ring as compared to center
$T_{delay,j}$—delay of the jth ring (it is zero for the 1st, center ring)
envelope—an envelope function described below delayed accordingly The envelope function can be any bandwidth limiting envelope. In one example the Hann window, known in the art, is used. The position of the envelope may have to be adjusted to take into account the pulse duration, if the definition of the envelope is centered at time zero.

Figure 13D:
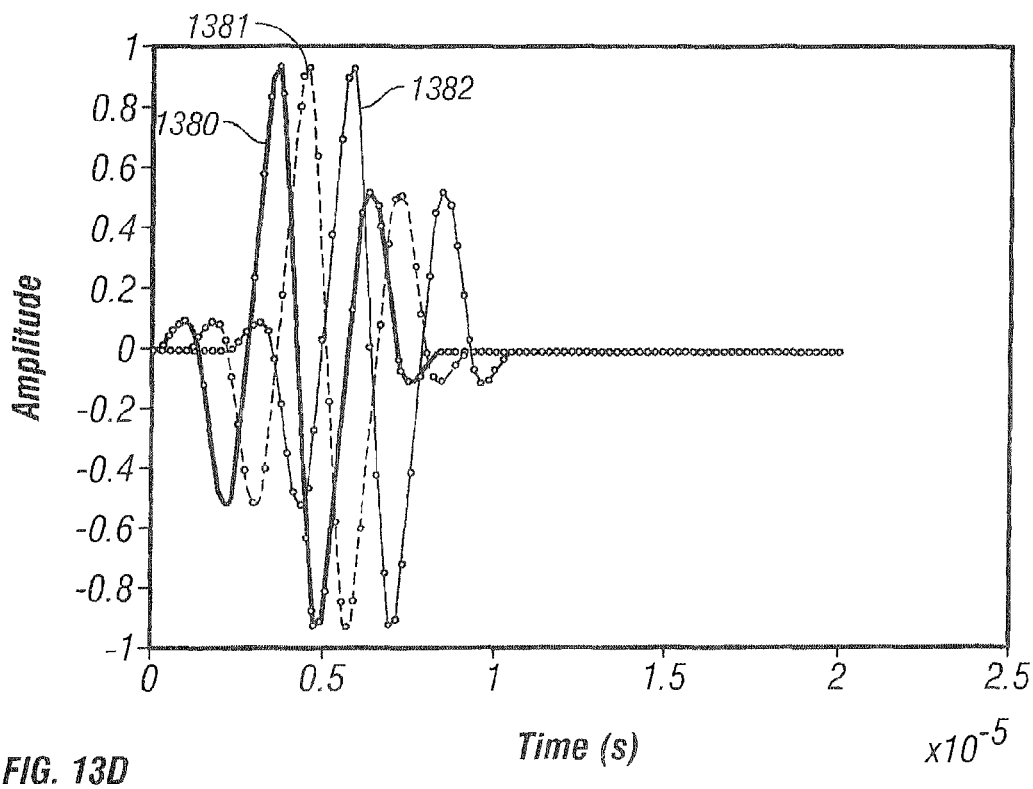
FIGS. 13D and 13E show characteristics of a narrow band transmitted pulse.
Figure 13E:
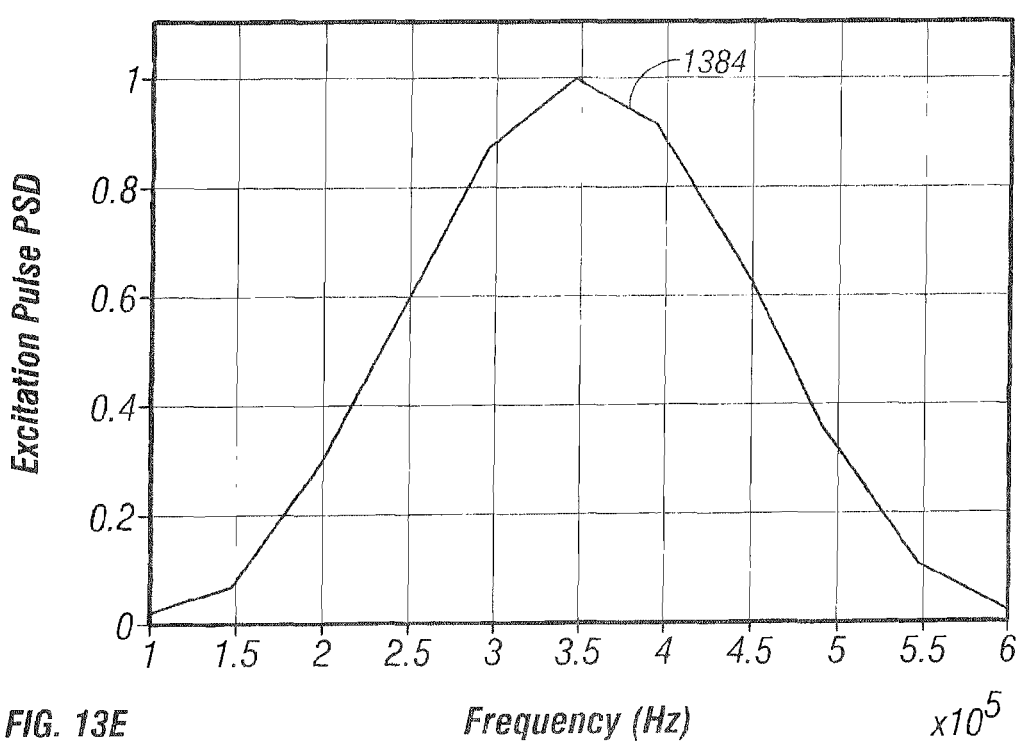

A calculated example of such a narrow band pulse is shown in FIGS. 13D and 13E using the following parameters and the equations described above.

$D_1$=0.025 m, distance from sensor center to focal point A in meters,
R1=0 m, sensor ring radius,
R2=0.01 m,
R3=0.013 m,
V=1500 m/sec,
F=350 kHz, operating frequency,
Nper=3, For the parameters given shown above, the excitation pulse generated is shown in FIG. 13D. The excitation signal 1380 for the outermost transducer starts first (the envelope peak is shifted) and its phase is leading the other pulses 1381, 1382 such that all phases match upon arrival at the focal point A.

In this example, the amplitudes of all pulses 1380, 1381, and 1382 have been normalized to the same value. While this is a good starting point for transducers with approximately equal electrode surface area, the amplitude may be adjusted to take into account the acoustic wave attenuation differences. This may further improve the gain of the array.

The spectrum of the generated signal is shown in FIG. 13E. In this example, the 3-period spectrum waveform 1384 is centered at 350 kHz, and has approx −3 dB bandwidth of 180 kHz. Increasing the NPer to 4 will reduce the bandwidth to under 150 kHz. The frequency characteristics of all channels (rings) should be substantially the same to avoid uncontrolled phase shifts in both the transmitting and receiving direction.

In one embodiment, the received acoustic echoes may be processed with a Finite Impulse Response (FIR) filter, known to those skilled in the art. In one example, with the FIR filter may have an impulse response substantially equal to that of the excitation pulses 1380, 1381 and 1382 respectively. In this example, the signal received by the center ring 1356 would be processed by a FIR filter with an impulse response equal to pulse 1382, while the signal from outermost ring 1360 would be processed by a FIR filter with an impulse response equal to pulse 1380. This process may reject out of band noise.

Figure 16:
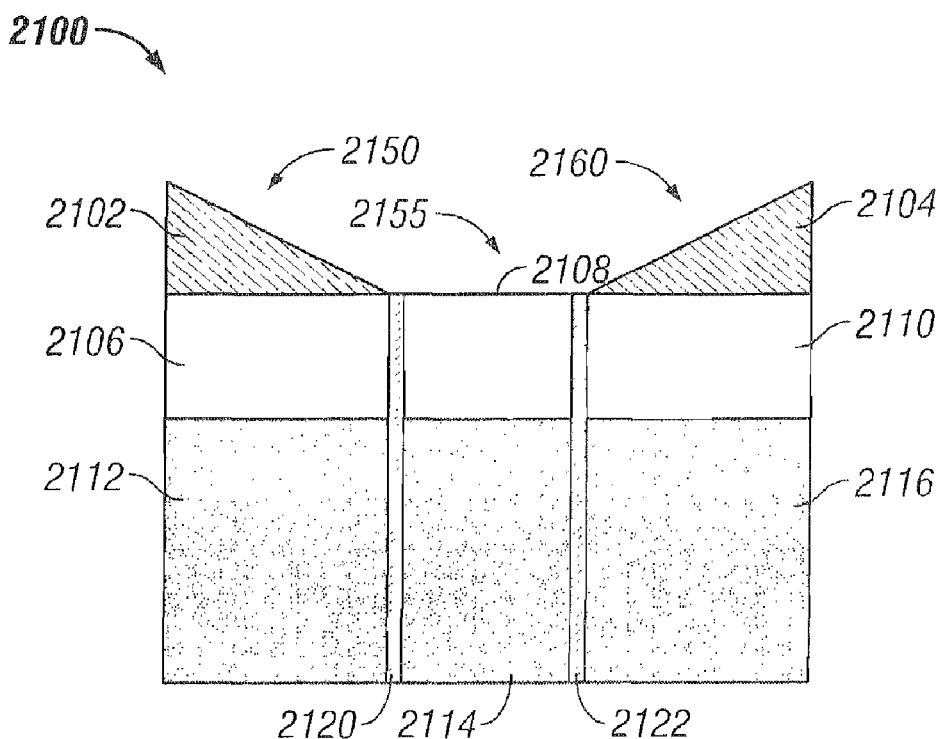
FIG. 16 is a cross sectional view of one example of a multi-element transducer.
Figure 17:
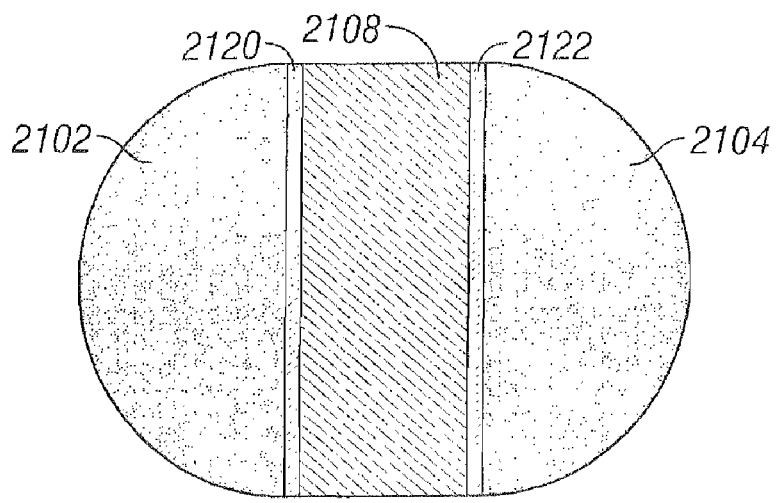
FIG. 17 is a top view of the transducer of FIG. 16.
Figure 18:
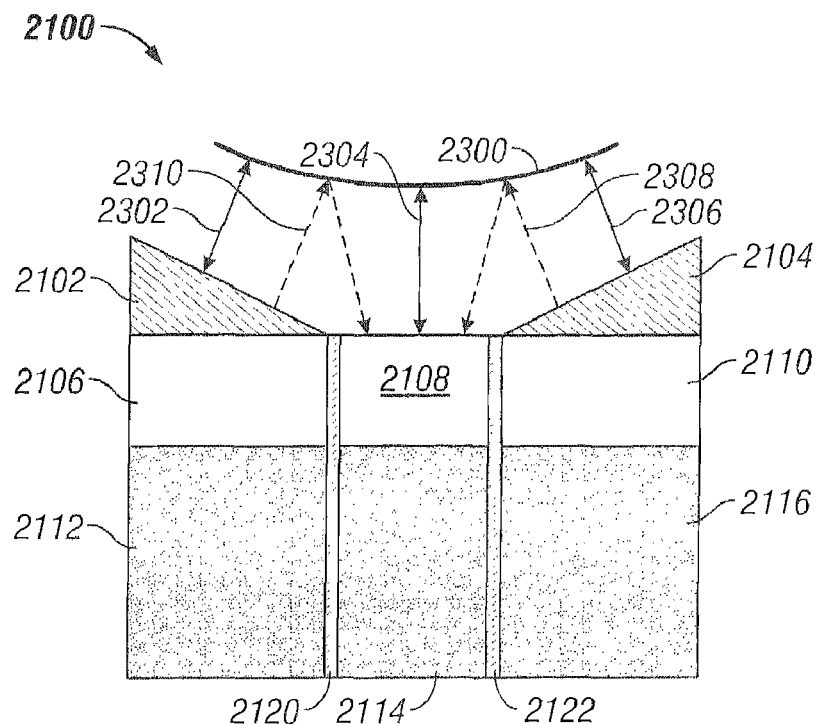
FIG. 18 is a cross sectional view of the propagation directions for the transducer of FIG. 16.

In another example, FIGS. 16-18 disclose a substantially fixed focus acoustic transducer for use in the present invention. FIG. 16 is a cross sectional view of a multi-element transducer, shown generally as 2100, having unpoled piezoelectric wedges 2102 and 2104, poled active piezoelectric sections 2106, 2108 and 2110, backing material 2112, 2114 and 2116, and acoustic isolator 2120 and 2122. FIG. 17 is a top view of transducer package 2100 of FIG. 16. FIG. 18 is a cross-sectional view of the propagation directions for transducer 2100 of FIG. 16.

Transducer package 2100 generally includes three active piezoelectric elements 2106, 2108 and 2110 having individual backing 2112, 2114 and 2116 respectfully. Element 2106 is completely separated from elements 2108 and 2110 by acoustic isolator 2120 and element 2110 is completely separated from elements 2108 and 2106 by acoustic isolator 2122 as shown in FIG. 17.

Active piezoelectric material for sections 2106, 2108 and 2110 are commercially available from a piezoelectric manufacturer. Non-limiting examples of suitable commercially available piezoelectric material include lead metaniobate and lead zirconate titanate.

Backings 2112, 2114 and 2116 may be any suitable material, capable of withstanding downhole temperatures. Preferably, the backing will attenuate acoustic waves from the backing side of the active piezoelectric element so that the reverberation of such waves in such backing is attenuated. Even more preferably, the backings are a material having an acoustic impedance similar to that of the piezoelectric material being used. In one example, the backings are a tungsten loaded epoxy or a tungsten loaded rubber as are known to those skilled in the art.

During assembly of transducer 2100, individual active piezoelectric elements 2106, 2108 and 2110 are bonded to backings 2112, 2114 and 2116, and unpoled piezoelectric wedges are bonded to active elements 2106 and 2110 to form three single units 2150, 2155 and 2160. Elements 2106, 2108 and 2110 are bonded to backings 2112, 2114 and 2116 by a commercial adhesive capable of withstanding downhole temperatures and bonding metal to glass.

Single units 2150, 2155 and 2160 are then tacked together with small bridges made of the epoxy used for potting with the bridges establishing the thickness of isolators 2120 and 2122. When package 2100 is potted with epoxy, the epoxy fills the gaps established by the bridges, forming uniform thickness isolators. The thickness of the epoxy layer being dependent upon and matched to the impedance of the material transmitting through, as is known in the art.

Referring now to FIG. 18, transducer 2100 can be used for either pulse-echo or pitch-catch operation. Wedges 2102 and 2104 permit pulse-echo detection of surfaces which are not perpendicular to the cylindrical axis of the transducer. This feature is important for eccentered tools in the borehole. For example, as shown in FIG. 18, pulse echo propagation off boundary 2300 may occur in directions 2302, 2304 and 2306 (3 places) and pitch catch propagation off boundary 2300 can occur in directions 2308 and 2310 (2 places).

The high frequency (0.4 MHz to 2 MHz) center transducer unit 2155 can detect walls at very short standoffs. For heavy weight muds, however, high frequency signals are attenuated, limiting radial range to about 1 inch. For greater radial distances, the outer transmitter units 2150 and 2160 have stacked piezoelectric elements to generate powerful signals. The outer elements 2106 and 2110 are designed to operate at lower frequencies (100 KHz to 300 KHz) than is the center transducer 2108.

Since the attenuation per wavelength is essentially constant, range increases inversely with transmitter frequency. The long ringdown reverberations of low frequency transducers 2150 and 2160 prevent detecting echoes for approximately the first inch of radial travel. The high frequency element 2155, however, covers the range from 0.3 to 1 inch for all muds. As a receiver, the high frequency element 2155 has flat response throughout the spectral range of the low frequency transducers. Furthermore, in pitch-catch operation, the high frequency receiver 2155 is decoupled from the backing reverberations of the low frequency transmitters 2150 and 2160, giving good signal to noise ratio. For greatest radial range, the broad radiation patterns of the low frequency transducers 2150 and 2160 give strong signals in the center receiver 2155 when both low frequency transmitters 2150 and 2160 are fired simultaneously.

Figure 19:
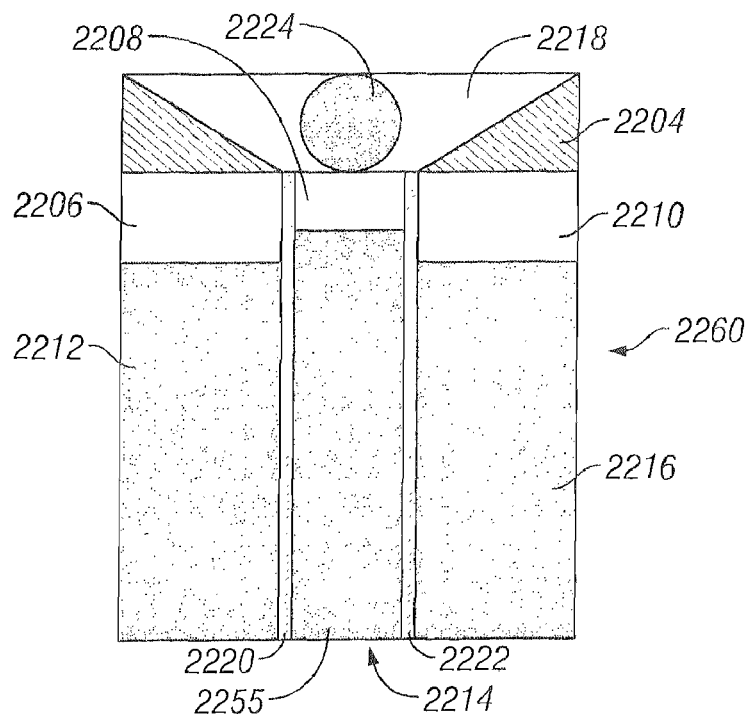
FIG. 19 is another example of a multi-element transducer.
Figure 20:
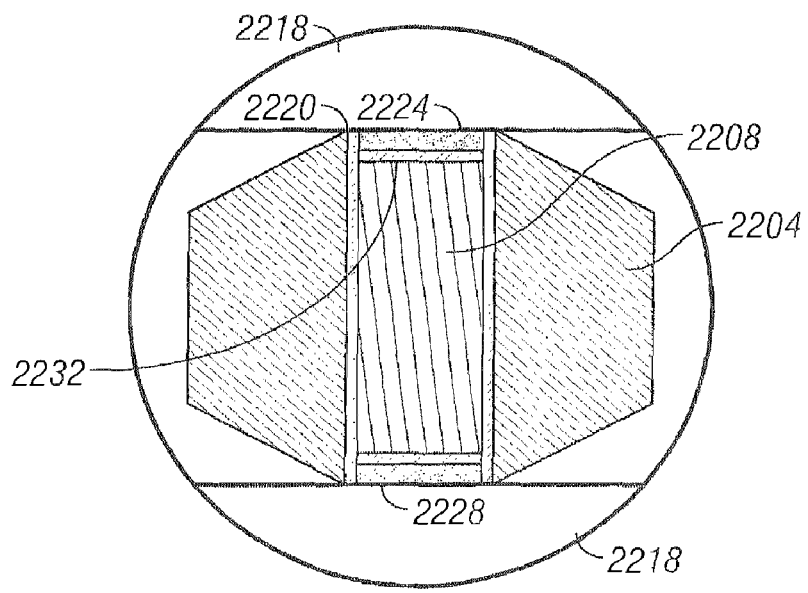
FIG. 20 is a top view of the multi-element transducer of FIG. 19.
Figure 21:
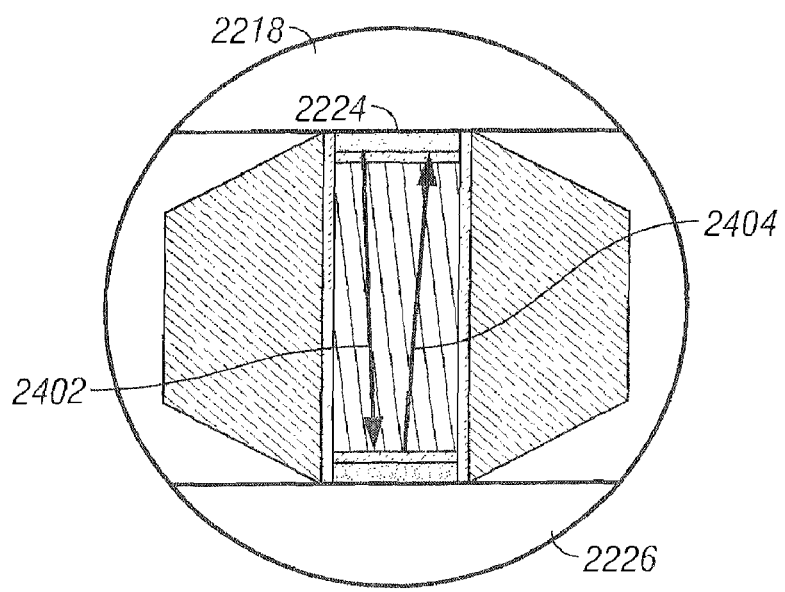
FIG. 21 is a top view of the multi-element transducer of FIG. 19 illustrating a pulse-echo acoustic path.

Referring now to FIGS. 19-22, another embodiment of a substantially fixed focus transducer is shown. FIG. 19 is a cross sectional view of multi-element transducer 2200, having unpoled piezoelectric wedges 2202 and 2204, poled active piezoelectric sections 2206, 2208 and 2210, piezoelectric for fluid velocity 2224, backing material 2212, 2214, 2216 and 2218 and acoustic isolators 2220 and 2222. FIG. 20 is a top view of transducer package 2200 of FIG. 19. FIG. 21 is top view of transducer package 2200 of FIG. 19 showing the pulse-echo acoustic path. FIG. 21 is top view of transducer package 2200 of FIG. 19 showing the pitch-catch acoustic path.

Referring to FIGS. 19 and 20, transducer package 2200 generally includes active piezoelectric elements 2206, 2208 and 2210 having individual backing 2212, 2214 and 2216 respectfully. Element 2206 is completely separated from elements 2208 and 2210 by acoustic isolator 2220 and element 2210 is completely separated from elements 2208 and 2206 by acoustic isolator 2222. Transducer package 2200 also includes piezoelectric element 2224.

Figure 22:
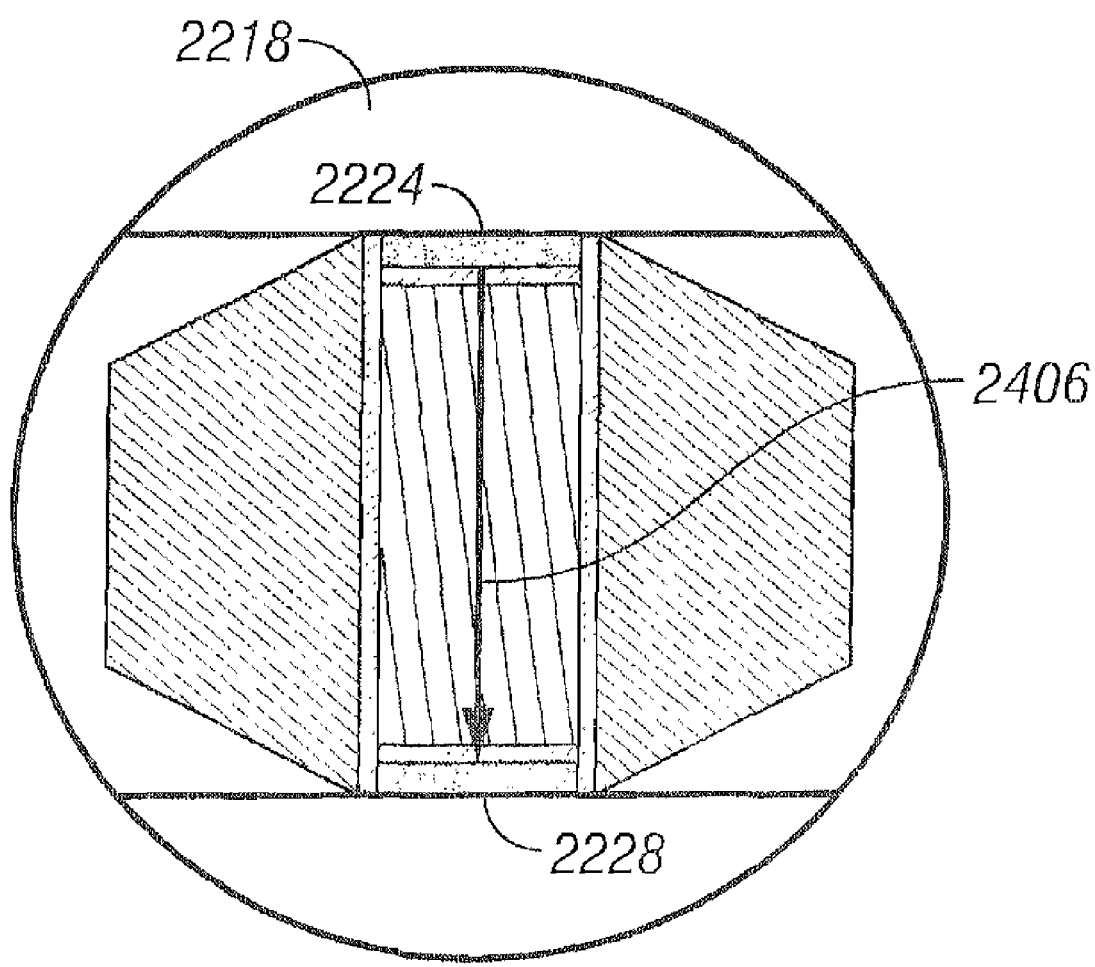
FIG. 22 is a top view of the multi-element transducer of FIG. 19 illustrating a pitch-catch acoustic path.

Referring now additionally to FIG. 21, for pulse-echo operation, transducer package 2200 includes transmitter receiver element 2224 and acoustic reflector 2226. Referring now additionally to FIG. 22, for pitch-catch operation, transducer package 2200 includes transmitter piezoelectric element 2224 and receiver piezoelectric element 2228. Elements 2224 and 2228, when utilized, are also completely isolated from elements 2206, 2208 and 2210 by insulators 2220, 2222 and 2232.

Active piezoelectric material for elements 2206, 2208, 2210, 2224 and 2228 are commercially available from a piezoelectric manufacturer. Non-limiting examples of suitable commercially available piezoelectric material include lead metaniobate and lead zirconate titanate.

Backings 2212, 2214, 2216 and 2218 may be any suitable material, capable of withstanding downhole temperatures. Preferably, the backings are a material having an acoustic impedance similar to that of the piezoelectric material being used. In one example, the backings are a tungsten loaded epoxy or a tungsten loaded rubber as are known to those skilled in the art.

During assembly of transducer 2200, individual active piezoelectric elements 2206, 2208 and 2210 are bonded to backings 2212, 2214 and 2216, and unpoled piezoelectric wedges are bonded to active elements 2206 and 2210 to form three single units 2250, 2255 and 2260. Piezoelectric elements 2224 and 2228 or piezoelectric element 2224 and acoustic reflector 2226 are bonded to backing 2218 and tacked to piezoelectric element 2208 with small bridges made of the epoxy used for potting with the bridges establishing the thickness of insulator 2232. Elements 2206, 2208, 2210, 2224 and 2228, when utilized, are bonded to backings 2212, 2214, 2216 and 2218 by a commercial adhesive capable of withstanding downhole temperatures and bonding metal to glass.

Single units 2250, 2255 and 2260 are tacked together with small bridges made of the epoxy used for potting with the bridges establishing the thickness of isolators 2220 and 2222. When package 2200 is potted with epoxy, the epoxy fills the gaps established by the bridges, forming isolators 2220 and 2222 with each insulator being of uniform thickness. The thickness of the epoxy layer being dependent upon and matched to the impedance of the material transmitting through, as is known in the art.

Referring now to FIGS. 21 and 22, transducer 2200 can be used for either pulse-echo or pitch-catch operation. Referring to FIG. 21 there is shown an illustration of the pulse-echo acoustic path for transducer 2200. In this configuration, piezoelectric element 2224 is a transmitter/receiver. The signal is transmitted along acoustic path 2402, reflected off acoustic reflector 2226 and received along acoustic path 2404.

Referring to FIG. 22 there is shown an illustration of the pitch-catch acoustic path for transducer 2200. In this configuration, piezoelectric element 2224 is a transmitter piezoelectric and piezoelectric element 2228 is a receiver piezoelectric.

The signal is transmitted from element 2224 along acoustic path 2406 and received by element 2228.

As with embodiment 2100 of the present invention, the outer elements 2206 and 2210 are designed to operate at lower frequencies than the center transducer 2208. Preferably, the elements 2206 and 2210 operate in the range of between about 100 KHz and about 300 KHz and elements 2208 and 2224 operate in the range of between about 0.4 MHz and about 2 MHz.

What is claimed is:

1. An apparatus for correcting a downhole measurement comprising:
 a tool in a bottomhole assembly in a borehole;
 at least one first sensor disposed in the tool to make a plurality of measurements of a parameter of interest during each tool revolution;
 at least one transducer disposed in the tool to measure a distance to a wall of the borehole associated with each parameter of interest measurement;
 at least one second sensor disposed in the tool to measure lateral motion of the tool between each measurement and a toolface angle of the tool at each measurement; and
 a controller comprising a processor to calculate a motion corrected distance referenced to a reference position for each of the plurality of distance measurements and a correction to each of the plurality of parameter of interest measurements based at least partly on the corresponding motion corrected distance.

2. The apparatus of claim 1 wherein the calculated correction comprises an axis translation from each measurement position to a reference position.

3. The apparatus of claim 2 wherein the calculated correction further comprises a correction of the measured toolface angle to a toolface angle referenced to the reference position.

4. The apparatus of claim 1 wherein the parameter of interest comprises borehole geometry.

5. The apparatus of claim 1 wherein the at least one first sensor is chosen from the group consisting of an acoustic imaging transducer, a magnetic resonance imaging sensor, and an electromagnetic wave resistivity sensor.

6. The apparatus of claim 1 wherein the at least one transducer is chosen from the group consisting of an acoustic transducer and a mechanical caliper transducer.

7. The apparatus of claim 6 wherein the at least one acoustic transducer transmits a first signal to the borehole wall and receives a reflected second signal from the borehole wall.

8. The apparatus of claim 7 wherein the transmitted signal comprises a narrow band pulse.

9. The apparatus of claim 7 wherein the controller further comprises a memory in data communication with the processor, the memory containing executable instructions for detecting an amplitude and a phase of a first signal transmitted to the borehole wall and a second signal reflected from the borehole wall and using the amplitude and phase of the second signal relative to the first signal to calculate a sound speed and an attenuation constant of a fluid in the wellbore.

10. The apparatus of claim 1 wherein the at least one second sensor comprises at least one accelerometer and at least one magnetometer.

11. The apparatus of claim 1 wherein the at least one second sensor comprises at least one gyroscope.

12. The apparatus of claim 1 wherein the controller further comprises a memory in data communication with the processor, the memory containing executable instructions for correcting the parameter of interest measurement based on the measured tool motion in real time.

13. The apparatus of claim 1 wherein the controller further comprises a data storage device to store the measured parameter of interest and the measured motion for correction at the surface.

14. A method for correcting a motion related distortion in a distance measurement comprising:
 establishing a reference position in a borehole;
 measuring using at least one transducer a plurality of substantially radial distances from a tool to a wall in a borehole as the tool makes a revolution in the borehole;
 sensing a motion of the tool in the borehole between each measurement;
 calculating using a controller processor a tool position and a toolface angle corresponding to each of the plurality of distance measurements based on the sensed motion of the tool; and
 calculating using a controller processor a motion corrected distance and corrected toolface angle referenced to the reference position for each of the plurality of radial distance measurements.

15. The method of claim 14 further comprising storing the motion corrected distance and toolface angle in a memory of a downhole controller.

16. The method of claim 14 wherein the sensing a motion of the tool in the borehole comprises sensing a tool acceleration.

17. The method of claim 14 wherein the measuring a plurality of substantially radial distances from a tool to a wall in a borehole as the tool makes a revolution in the borehole comprises transmitting an acoustic signal from the tool to the wall of the borehole and detecting a reflected signal from the wall of the borehole.

18. The method of claim 17 further comprising calculating a sound speed and an attenuation coefficient of a drilling fluid in the borehole based at least in part on an amplitude and a phase of the reflected signal referenced to the transmitted signal.

19. The method of claim 14 wherein the corrected tool position and the corrected toolface angle for each of the plurality of radial distance measurements are calculated in a downhole controller.

20. A non-transitory computer readable medium having stored therein instructions, which when executed on a processor, implements a method of correcting a motion related distortion in a distance measurement comprising:
 establishing a reference position in a borehole;
 measuring a plurality of substantially radial distances from a tool to a wall in a borehole as the tool makes a revolution in the borehole;
 sensing a motion of the tool in the borehole between each measurement;
 calculating a tool position and a toolface angle corresponding to each of the plurality of distance measurements based on the sensed motion of the tool; and
 calculating a motion corrected distance and toolface angle relative to the reference position for each of the plurality of radial distance measurements.

21. The non-transitory computer readable medium of claim 20 wherein the sensing a motion of the tool in the borehole comprises sensing a tool acceleration.

22. The non-transitory computer readable medium of claim 20 wherein the measuring a plurality of substantially radial distances from a tool to a wall in a borehole as the tool makes a revolution in the borehole comprises transmitting a signal from the tool to the wall of the borehole and detecting a reflected signal from the wall of the borehole.

23. The non-transitory computer readable medium of the claim 22 wherein the transmitted signal and the reflected signal are acoustic signals.

24. The non-transitory computer readable medium of claim 23 wherein a sound speed and an attenuation coefficient of a drilling fluid in the borehole are each determined based at least in part on the amplitude and phase of the reflected signal referenced to the transmitted signal.

25. A method for correcting a motion related distortion in a sensor measurement comprising:
   establishing a reference position in a borehole;
   measuring a parameter of interest at a plurality of toolface angles as the tool makes a revolution in the borehole;
   measuring a distance to a wall of the borehole associated with each parameter of interest measurement;
   measuring lateral motion of the tool between each parameter of interest measurement and a toolface angle of the tool at each parameter of interest measurement;
   calculating using a controller processor a motion corrected distance and toolface angle relative to the reference position for each of the plurality of radial distance measurements; and
   calculating using a controller processor a correction to the parameter of interest measurement referenced to the reference position based at least partly on the corrected distance and toolface angle relative to the reference position for each of the plurality of radial distance measurements.

26. The method of claim 25 wherein the parameter of interest comprises borehole geometry.

27. The method of claim 25 further comprising storing the motion corrected parameter of interest and toolface angle as a function of depth in a memory of a downhole controller.

* * * * *